(12) United States Patent
Taguchi et al.

(10) Patent No.: US 12,333,447 B2
(45) Date of Patent: Jun. 17, 2025

(54) PATH OPTIMIZATION USING MULTI-DOMAIN KNOWLEDGE GRAPHS FOR INFERENCE IN DIALOG SYSTEMS

(71) Applicant: Mitsubishi Electric Corporation, Tokyo (JP)

(72) Inventors: Shinya Taguchi, Tokyo (JP); Yusuke Seto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1166 days.

(21) Appl. No.: 17/171,058

(22) Filed: Feb. 9, 2021

(65) Prior Publication Data

US 2021/0166141 A1   Jun. 3, 2021

Related U.S. Application Data

(63) Continuation of application No. PCT/JP2018/036198, filed on Sep. 28, 2018.

(51) Int. Cl.
*G06N 5/04* (2023.01)
*G06F 16/901* (2019.01)
(Continued)

(52) U.S. Cl.
CPC .......... *G06N 5/04* (2013.01); *G06F 16/9024* (2019.01); *G06F 17/18* (2013.01); *G06N 5/02* (2013.01)

(58) Field of Classification Search
CPC ........ G06N 5/02; G06N 5/04; G06F 16/9024; G06F 17/18
See application file for complete search history.

(56) References Cited

U.S. PATENT DOCUMENTS 10,496,678 B1 * 12/2019 Tang ................. G06F 16/29
10,534,862 B2 * 1/2020 Canim ................ G06F 40/30
(Continued)

FOREIGN PATENT DOCUMENTS

JP       2011-28339 A    2/2011
JP       6022111 B2     11/2016
WO   WO 2018/083729 A1  5/2018

OTHER PUBLICATIONS

Miller et al., "Dynamic Fastest Paths with Multiple Unique Destinations (DynFast-MUD)—A Specialized Traveling Salesman Problem with Intermediate Cities," Proceedings of the 12th International IEEE Conference on Intelligent Transportation Systems, Oct. 3-7, 2009, pp. 570-575 (Year: 2009).*

(Continued)

*Primary Examiner* — Eric J. Bycer
(74) *Attorney, Agent, or Firm* — Birch, Stewart, Kolasch & Birch, LLP

(57) ABSTRACT

An inference device includes processing circuitry to generate integrated information by combining items of information respectively belonging to domains different from each other included in dynamically changing external information by means of forward chaining by using knowledge information including information regarding a human's condition and information regarding a human's action and provided from a knowledge base and an inference rule provided from a rule database. Each of the items of information respectively belonging to domains different from each other is information that can be represented as a directed graph including a node and an edge. The integrated information is an integrated graph. The processing circuitry calculates an importance level of a node as a component of the integrated graph from a probability of arriving at the node in a stationary state reached by performing a random (Continued)

walk on the integrated graph or by using an algorithm of PageRank.

8 Claims, 23 Drawing Sheets

(51) Int. Cl.
*G06F 17/18* (2006.01)
*G06N 5/02* (2023.01)

(56) References Cited

U.S. PATENT DOCUMENTS

| | | | | |
|---|---|---|---|---|
| 2010/0121792 | A1* | 5/2010 | Yang | G06F 16/9024 708/441 |
| 2010/0223266 | A1* | 9/2010 | Balmin | G06F 16/951 707/E17.014 |
| 2012/0278261 | A1* | 11/2012 | Lin | G06N 5/01 707/690 |
| 2017/0010778 | A1 | 1/2017 | Taguchi | |
| 2017/0032273 | A1* | 2/2017 | Ho | G06N 7/01 |
| 2017/0279692 | A1* | 9/2017 | Llagostera | H04L 41/5051 |
| 2018/0060448 | A1* | 3/2018 | Miyamoto | G06F 16/00 |
| 2019/0286943 | A1* | 9/2019 | Leskovec | G06F 18/29 |

OTHER PUBLICATIONS

R iGraph manual, captured on Jun. 8, 2017, retrieved from https://web.archive.org/web/20170608000045/http://igraph.org:80/r/doc/as.directed.html on Mar. 23, 2024 (Year: 2017).*
Transpose Graph, Wikipedia, copy published on Jun. 21, 2018, retrieved from https://en.wikipedia.org/w/index.php?title=Transpose_graph&oldid=846946041 on Mar. 23, 2024 (Year: 2018).*
Bander et al., "A Heuristic Search Algorithm for Path Determination with Learning," IEEE Transactions on Systems, Man, and Cybernetics—Part A: Systems and Humans, vol. 28, No. 1, Jan. 1998, pp. 131-134 (Year: 1998).*
Guerin et al., "Computing Shortest Paths for Any Number of Hops," IEEE/ACM Transactions on Networking, vol. 10, No. 5, Oct. 2002, pp. 613-620. (Year: 2002).*
Kim et al., "Extracting Optimal Paths from Roadmaps for Motion Planning," Proceedings of the 2003 IEEE International Conference on Robotics & Automation, Sep. 14-19, 2003, pp. 2424-2429. (Year: 2003).*
Wang et al., "An Enhanced Algorithm for Multiple Constraints Optimal Path Calculation," IEEE, 2004, pp. 703-713 (Year: 2004).*
Rajagopalan et al., "Hierarchical Path Computation Approach for Large Graphs," IEEE Transactions on Aerospace and Electronic Systems, vol. 44, No. 2, Apr. 2008, pp. 427-440 (Year: 2008).*
Feng et al., "Finding Multi-Constrained Multiple Shortest Paths," IEEE Transactions on Computers, col. 54, No. 9, Sep. 2015, pp. 2559-2572 (Year: 2015).*
Rawal et al., "Kth Shortest Path for Dynamic Edges," IEEE 2015 2nd International Conference on Computing for Sustainable Global Development (INDIACom), pp. 1000-1003 (Year: 2015).*
Khabbaz, Mohammad, "Finding HeavyPaths in Weighted Graphs and a Case-Study on Community Detection," ACM, retrieved from arXiv:1512.010410v1, Dec. 13, 2015, 11 pgs. (Year: 2015).*
Wu et al., "Improving the Performance of Arrival on time in Stochastic Shortest Path Problem," 2016 IEEE 19th International Conference on Intelligent Transportation Systems (ITSC), Nov. 1-4, 2016, pp. 2346-2353 (Year: 2016).*
Madkour et al., "A Survey of Shortest-Path Algorithms," May 8, 2017, retrieved from arXiv:1705.02044v1, 26 pgs. (Year: 2017).*
Dhingra et al., "Towards End-to-End Reinforcement Learning of Dialogue Agents for Information Access", Proceedings of the 55th Annual Meeting of the Association for Computational Linguistics 2017, total 12 pages.
Kawahara et al., "Frontier-based Search for Enumerating All Constrained Subgraphs with Compressed Representation", TCS Technical Report, Division of Computer Science, Report Series A, Sep. 30, 2014, total 25 pages.
Page et al., "The PageRank Citation Ranking: Bringing Order to the Web", Technical Report. Stanford InfoLab., 1998, total 17 pages.
Sukhbaatar et al., "End-To-End Memory Networks", NIPS 2015, total 11 pages.

* cited by examiner

INFERENCE DEVICE

INFERENCE DEVICE

FIG. 6

| TABLE 3 EXAMPLE OF KNOWLEDGE BASE 11a |||
|---|---|---|
| SUBJECT | PREDICATE | OBJECT |
| indoor device | has | navi #2 |
| indoor device | has | illuminator #3 |
| indoor device | has | window #4 |
| indoor device | has | music player #5 |
| air conditioner #1 | instanceOf | air conditioner class |
| navi #2 | instanceOf | navi class |
| illuminator #3 | instanceOf | illuminator class |
| window #4 | instanceOf | window class |
| music player #5 | instanceOf | music player class |
| ice cream | instanceOf | cold food class |
| cold ramen | instanceOf | cold food class |
| miso ramen | instanceOf | warm food class |
| tonkotsu ramen | instanceOf | warm food class |
| shoyu ramen | instanceOf | warm food class |
| ice cream | instanceOf | sweet food class |
| parfait | instanceOf | sweet food class |
| cold ramen | instanceOf | ramen class |
| miso ramen | instanceOf | ramen class |
| tonkotsu ramen | instanceOf | ramen class |
| shoyu ramen | instanceOf | ramen class |
| hot | then | decrease temperature |
| hot | then | open window |
| hot | then | eat cold food |
| cold | then | increase temperature |
| cold | then | close window |
| cold | then | eat warm food |
| eat cold food | slot | cold food class |
| eat cold food | subAct | eat |
| eat warm food | slot | warm food class |
| eat warm food | subAct | eat |
| decrease temperature | slot | air conditioner class |
| increase temperature | slot | air conditioner class |
| increase volume level | slot | music player class |
| decrease volume level | slot | music player class |
| increase temperature | slot | temperature |
| increase temperature | subAct | increase |
| decrease temperature | slot | temperature |
| decrease temperature | subAct | decrease |
| increase volume level | slot | volume level |
| increase volume level | subAct | increase |
| decrease volume level | slot | volume level |
| decrease volume level | subAct | decrease |

FIG. 7

| TABLE 4 | | |
|---|---|---|
| DATA GENERATED BY DYNAMIC INFORMATION ACQUISITION UNIT 13 | | |
| SUBJECT | PREDICATE | OBJECT |
| outside-vehicle condition | temperature | 35°C |
| outside-vehicle condition | humidity | 90% |
| nearby shop | has | ice cream shop #6 |
| nearby shop | has | ramen restaurant #7 |
| ice cream shop #6 | sell | ice cream |
| ramen restaurant #7 | sell | cold ramen |
| ramen restaurant #7 | sell | shoyu ramen |
| present time | is | 12 p.m. |
| most recent command | is | decrease volume level |
| driver | name | Taro Tokyo |
| driver | like | ramen class |

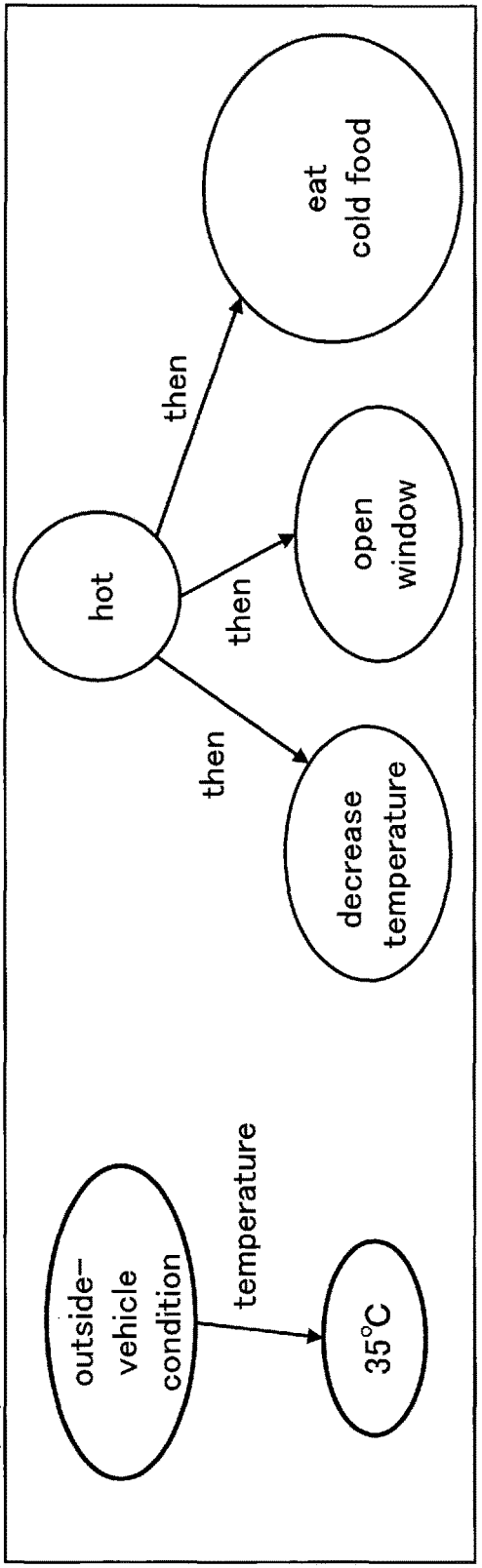
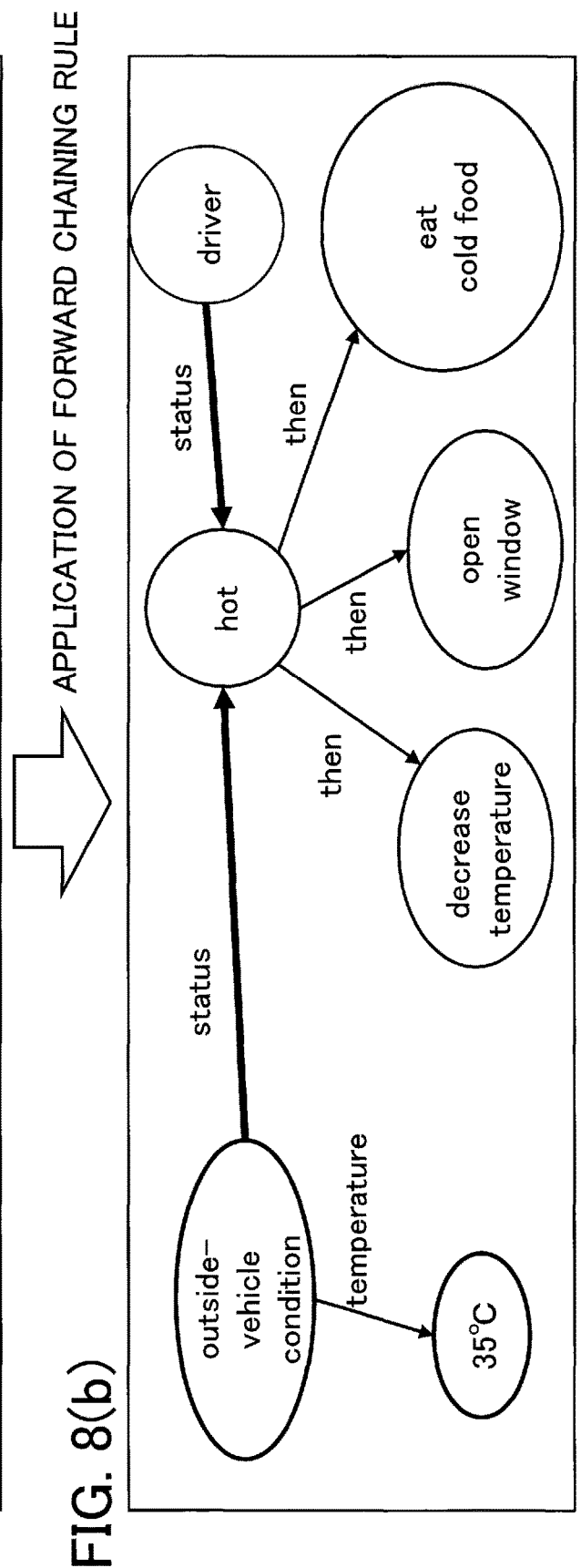
FIG. 8(a)
FIG. 8(b)
APPLICATION OF FORWARD CHAINING RULE

DEDUCTIVE REASONING

INDUCTIVE REASONING

ABDUCTIVE REASONING

FIG. 11

TABLE 5  GRAPH SEARCH RESULT

--- sorted actions ---

{slotClass: 'cold food class', action: 'eat cold food', slotValue: 'cold ramen'}

{slotClass: 'cold food class', action: 'eat cold food', slotValue: 'ice cream'}

{slotClass: 'warm food class', action: 'eat warm food', slotValue: 'shoyu ramen'}

{slotClass: 'warm food class', action: 'eat warm food', slotValue: 'miso ramen'}

{slotClass: 'warm food class', action: 'eat warm food', slotValue: 'tonkotsu ramen'}

{slotClass: 'air conditioner class', action: 'decrease temperature', slotValue: 'air conditioner #1'}

{slotClass: 'air conditioner class', action: 'increase temperature', slotValue: 'air conditioner #1'}

{slotClass: 'music player class', action: 'decrease volume level', slotValue: 'music player #5'}

{slotClass: 'music player class', action: 'increase volume level', slotValue: 'music player #5'}

FIG. 13

TABLE 6  GRAPH SEARCH RESULT WHEN "decrease" IS SET AS OBSERVATION NODE

--- sorted actions ---

{slotClass: 'air conditioner class', action: 'decrease temperature', slotValue: 'air conditioner #1'}

{slotClass: 'cold food class', action: 'eat cold food', slotValue: 'cold ramen'}

{slotClass: 'cold food class', action: 'eat cold food', slotValue: 'ice cream'}

{slotClass: 'music player class', action: 'decrease volume level', slotValue: 'music player #5'}

{slotClass: 'warm food class', action: 'eat warm food', slotValue: 'shoyu ramen'}

{slotClass: 'warm food class', action: 'eat warm food', slotValue: 'miso ramen'}

{slotClass: 'warm food class', action: 'eat warm food', slotValue: 'tonkotsu ramen'}

{slotClass: 'air conditioner class', action: 'increase temperature', slotValue: 'air conditioner #1'}

{slotClass: 'music player class', action: 'increase volume level', slotValue: 'music player #5'}

FIG. 15

TABLE 7  GRAPH SEARCH RESULT WHEN "most recent command" IS ADDED TO OBSERVATION NODES

---- sorted actions ----

[slotClass: 'music player class',      action: 'decrease volume level',    slotValue: 'music player #5']

[slotClass: 'air conditioner class',   action: 'decrease temperature',     slotValue: 'air conditioner #1']

[slotClass: 'music player class',      action: 'increase volume level',    slotValue: 'music player #5']

[slotClass: 'air conditioner class',   action: 'increase temperature',     slotValue: 'air conditioner #1']

[slotClass: 'cold food class',         action: 'eat cold food',            slotValue: 'cold ramen']

[slotClass: 'cold food class',         action: 'eat cold food',            slotValue: 'ice cream']

[slotClass: 'warm food class',         action: 'eat warm food',            slotValue: 'shoyu ramen']

[slotClass: 'warm food class',         action: 'eat warm food',            slotValue: 'miso ramen']

[slotClass: 'warm food class',         action: 'eat warm food',            slotValue: 'tonkotsu ramen']

FIG. 19

TABLE 8

| NODE NAME | RATIO OF VALUE IN INITIAL OBSERVATION VECTOR | FIRST INFERENCE ||| SECOND INFERENCE |||
|---|---|---|---|---|---|---|---|
| | | RATIO OF IMPORTANCE LEVEL | USER SELECTION RESULT | RATIO IN UPDATED OBSERVATION VECTOR | RATIO OF IMPORTANCE LEVEL | USER SELECTION RESULT | RATIO IN UPDATED OBSERVATION VECTOR |
| ICE CREAM CLASS | 1 | 2 | | 1 | 2 | | 1 |
| RAMEN CLASS | 1 | 2 | | 2 | 3 | | 3 |
| SHOYU RAMEN CLASS | 0 | 1 | SELECTED | 1 | — | | 1 |
| TONKOTSU RAMEN CLASS | 0 | — | | 0 | 2 | SELECTED | 1 |
| VANILLA ICE CREAM CLASS | 0 | 1 | | 0 | — | | 0 |
| STRAWBERRY ICE CREAM CLASS | 0 | — | | 0 | 1 | | 0 |

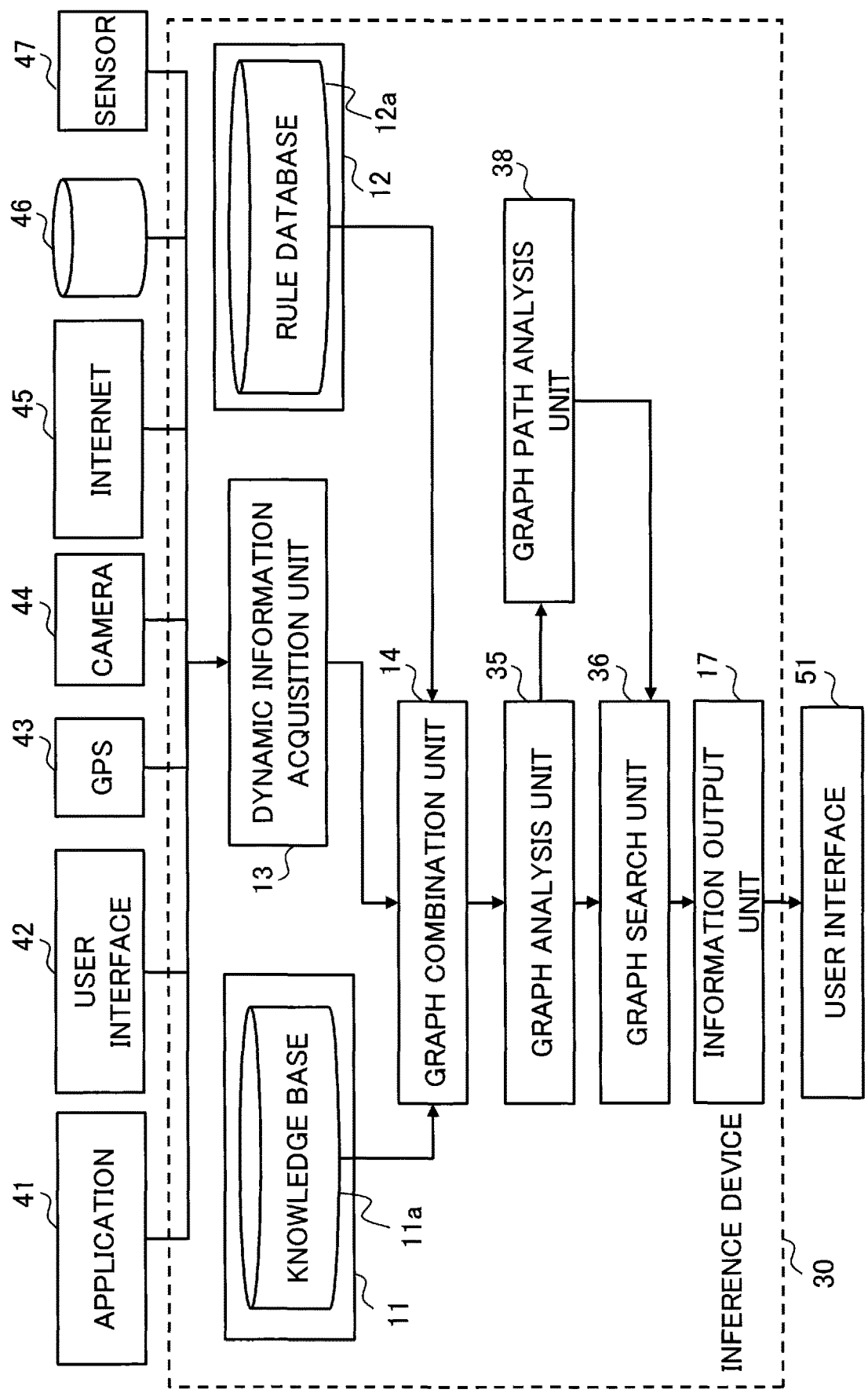

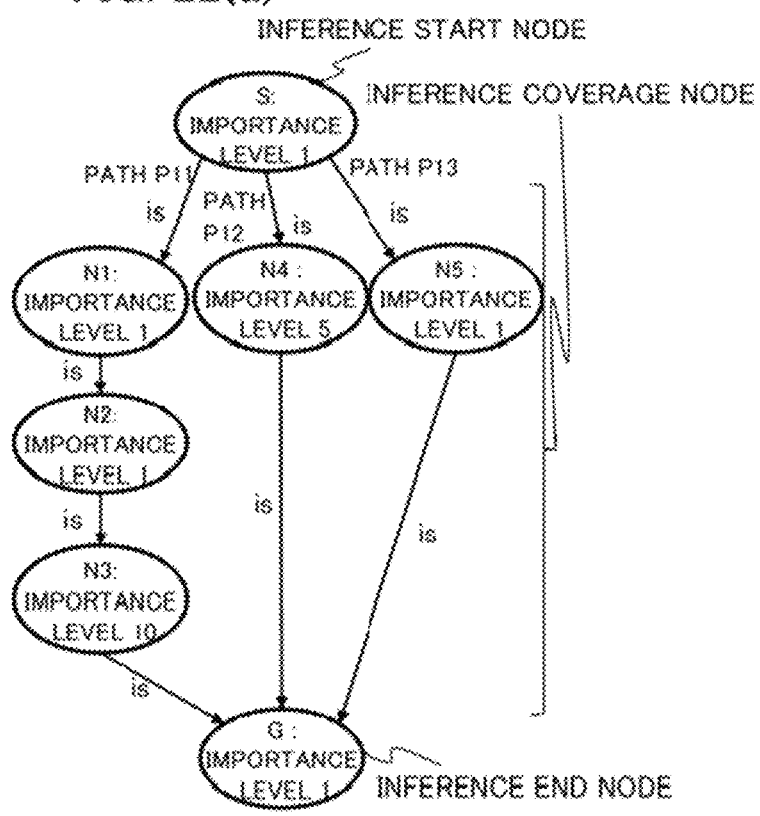

GRAPH BEFORE APPLYING INFERENCE RULES

GRAPH AFTER APPLYING INFERENCE RULES

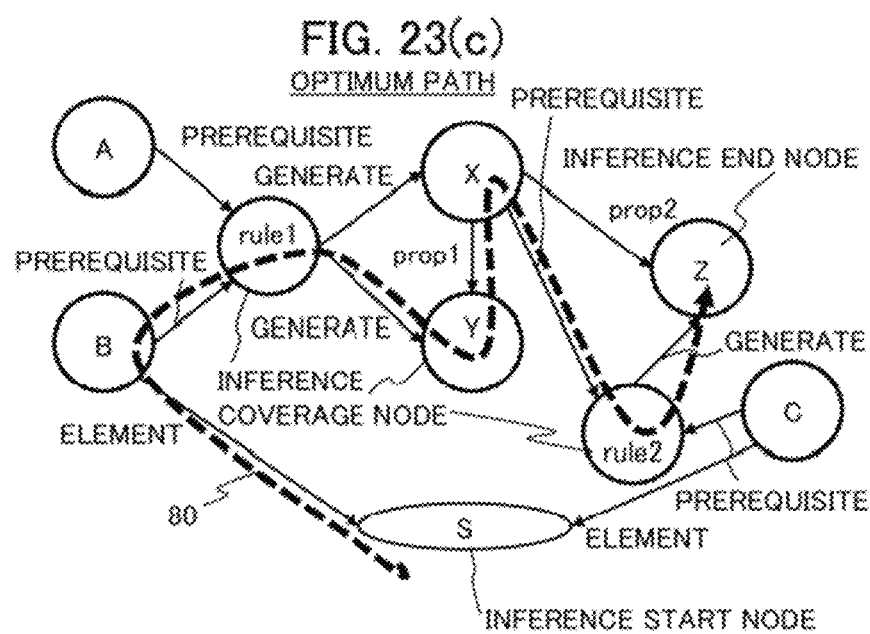

PATH OPTIMIZATION USING MULTI-DOMAIN KNOWLEDGE GRAPHS FOR INFERENCE IN DIALOG SYSTEMS

CROSS-REFERENCE TO RELATED APPLICATION

This application is a continuation application of International Application No. PCT/JP2018/036198 having an international filing date of Sep. 28, 2018.

BACKGROUND OF THE INVENTION

1. Field of the Invention

The present invention relates to an inference device, an inference method, and an inference program.

2. Description of the Related Art

In recent years, with the progress in deep learning technology and the third AI (Artificial Intelligence) boom, user interfaces utilizing artificial intelligence such as smart speakers are becoming widespread. As principal methods for realizing a user interface utilizing artificial intelligence, there are the following two methods: The first method is a method of manually designing the user interface (see Patent References 1 and 2, for example). The second method is a method using machine learning for the user interface (see Non-patent References 1 and 2, for example).

The Patent Reference 1 describes a technology as an example of the first method, in which a multimodal interface that uses a plurality of communication modes including speech dialog is designed by using a state chart. The Patent Reference 2 describes a technology as an example of the first method, in which an operation sequence such as speech dialog is described as a state chart and the operation sequence is executed at high speed.

The Non-patent Reference 1 describes a technology as an example of the second method, in which memory structure is added to a neural network and end-to-end supervised learning is performed on dialog data. The Non-patent Reference 2 describes a technology as an example of the second method, in which end-to-end reinforcement learning is performed on dialog data obtained by using a knowledge base.

Patent Reference 1: Japanese Patent Publication No. 6022111

Patent Reference 2: WO 2018/083729

Non-patent Reference 1: S. Sukhbaatar and three others, "End-To-End Memory Networks", NIPS 2015.

Non-patent Reference 2: B. Dhingra and six others, "Towards End-to-End Reinforcement Learning of Dialogue Agents for Information Access", Proceedings of the 55th Annual Meeting of the Association for Computational Linguistics 2017.

However, even by using any one of the above-described technologies, it is difficult to realize dialog that is appreciated by a human as being "tactful" in various situations. Examples of intellectual dialog performed by an artificial intelligence agent (hereinafter referred to also as an "AG") that is appreciated by a human (hereinafter referred to also as a "user") as being "tactful" are shown in the following Table 1 as dialog examples D1 and D2:

TABLE 1

| EXAMPLES OF DIALOG | |
|---|---|
| DIALOG EXAMPLE D1 | (In a situation in which the user is driving an automobile in midsummer) The user utters "Decrease the temperature.", and the AG utters "Decreased the set temperature by 1 degree.". |
| DIALOG EXAMPLE D2 | (In a situation in which twelve noon comes around when the user is driving an automobile) The AG utters "There is a restaurant serving cold ramen near here.", and the user utters "Sounds nice, navigate me there.". |

In order to make the AG automatically perform the tactful dialog "There is a restaurant serving cold ramen near here." as in the dialog example D2, two elemental technologies "information integration" and "inference" are necessary.

The "information integration" is an elemental technology of integrating items of information respectively belonging to multiple domains different from each other. The items of information respectively belonging to multiple domains different from each other can be, for example, knowledge regarding weather, history records of operation by a human, navigation (also referred to simply as "navi") information, a human's preference, a human's action, and so forth. The human is a driver, for example. The knowledge regarding a human's action is, for example, information regarding a human's action, such as "Eats cold food when it's hot.".

The "inference" is an elemental technology of deductive reasoning, for example. The following examples (D3) to (D5) are examples of deductive reasoning:

(D3) "The fact that the user decreased the set temperature of the air conditioner means that the user is feeling hot."

(D4) "The fact that the user is feeling hot means that the user is feeling like eating cold food."

(D5) "The fact that the user is feeling like eating cold food means that a restaurant serving cold ramen should be recommended to the user since there is the restaurant serving cold ramen near here."

In environments in which usable information changes dynamically as in the dialog examples D1 and D2, it is difficult to manually design the dialog sequence by enumerating all states like the aforementioned first method.

Similarly, in environments in which usable information changes dynamically, collecting dialog data comprehensively covering all cases requires an extremely high cost or is practically impossible. Thus, in the aforementioned second method, it is difficult to perform end-to-end supervised learning on dialog data.

Further, in order to perform end-to-end reinforcement learning on dialog data in the aforementioned second method in environments in which usable information changes dynamically, a dialog simulator for efficiently collecting learning data is necessary. However, it is difficult to produce a dialog simulator capable of dealing with all sorts of situations.

SUMMARY OF THE INVENTION

An object of the present invention, which has been made to resolve the above-described problems with the conventional technologies, is to provide an inference device, an inference method and an inference program that make it possible to derive an inference result suitable for the user from items of information respectively belonging to multiple domains.

An inference device according to an aspect of the present invention includes processing circuitry to generate integrated information by combining items of information respectively belonging to domains different from each other included in dynamically changing external information by means of forward chaining by using knowledge information including information regarding a human's condition and information regarding a human's action and provided from a knowledge base and an inference rule provided from a rule database, wherein each of the items of information respectively belonging to domains different from each other is information that can be represented as a directed graph including a node and an edge, the integrated information is an integrated graph generated by combining directed graphs that are the items of information respectively belonging to different domains, and the processing circuitry calculates an importance level of a node as a component of the integrated graph from a probability of arriving at the node in a stationary state reached by performing a random walk on the integrated graph or by using an algorithm of PageRank.

An inference method according to another aspect of the present invention includes generating integrated information by combining items of information respectively belonging to domains different from each other included in dynamically changing external information by means of forward chaining by using the knowledge information regarding a human's condition and information regarding a human's action and provided from a knowledge base and an inference rule provided from a rule database, wherein each of the items of information respectively belonging to domains different from each other is information that can be represented as a directed graph including a node and an edge, and the integrated information is an integrated graph generated by combining directed graphs that are the items of information respectively belonging to different domains; and setting an inference start node, an inference coverage node and an inference end node among the nodes in the integrated graph and calculates an optimum path among paths in the integrated graph connecting the inference start node and the inference end node.

According to the present invention, an inference result suitable for the user can be derived from items of information respectively belonging to multiple domains even in an environment in which the items of information respectively belonging to the multiple domains change dynamically.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a diagram showing an example of a knowledge base in the first embodiment in tabular form (Table 3);

FIG. 7 is a diagram showing an example of data generated by a dynamic information acquisition unit of the inference device according to the first embodiment in tabular form (Table 4);

FIGS. 8(a) and 8(b) are diagrams showing how a graph combination unit of the inference device according to the first embodiment generates a directed graph by using a forward chaining rule as an inference rule stored in a rule database;

FIG. 11 is a diagram showing an example of data acquired by a graph search unit of the inference device according to the first embodiment by searching a graph in tabular foam (Table 5);

FIG. 13 is a diagram showing an example of an operation for understanding a user's intention by using the inference device according to the first embodiment in tabular form (Table 6);

FIG. 15 is a diagram showing an example of an operation for understanding the user's attention by using the inference device according to the first embodiment in tabular form (Table 7);

FIG. 19 is a diagram showing an example of the operation of a graph analysis unit of the inference device according to the second embodiment in tabular form (Table 8);

FIG. 20 is a functional block diagram schematically showing a configuration of an inference device according to a third embodiment of the present invention;

FIGS. 22(a) and 22(b) are diagrams showing other examples of the operation of the graph path analysis unit of the inference device according to the third embodiment; and FIGS. 23(a) to 23(c) are diagrams showing still another example of the operation of the graph path analysis unit of the inference device according to the third embodiment.

DETAILED DESCRIPTION OF THE INVENTION

Inference devices, inference methods and inference programs according to embodiments of the present invention will be described below with reference to the drawings. The following embodiments are just examples and a variety of modifications are possible within the scope of the present invention.

(1) First Embodiment

(1-1) Configuration

Figure 5:
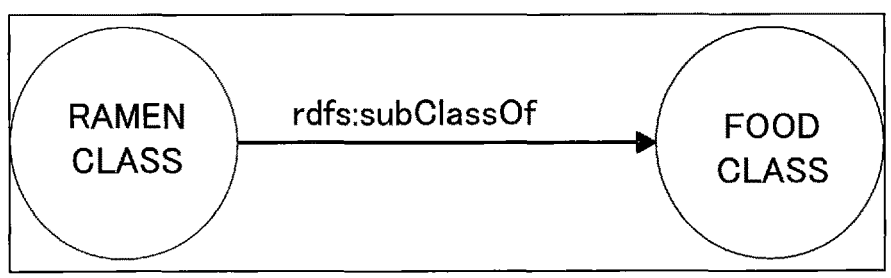
FIG. 5 is a diagram showing an example of RDF representation by using a directed graph.

An inference device according to a first embodiment integrates items of information respectively belonging to multiple domains different from each other by a method using graphs and thereby generates an integrated graph as the integrated information. Further, the inference device according to the first embodiment can include a configuration for deriving an inference result from the integrated graph as the integrated information. Here, the graph is a figure including an apex (i.e. node) and a side (i.e., edge) as components. A method for deriving the inference result is, for example, a graph analysis method not needing learning data. The graphs are classified mainly into directed graphs and non-directed graphs. The directed graph is formed with an apex and a side having a direction (i.e., arrow). The non-directed graph is formed with an apex and a side having no direction. The non-directed graph is equivalent to a bidirectional graph formed with an apex and a side having two opposite directions. The directed graphs in the first embodiment are shown in FIG. 5, FIG. 8(a), FIG. 8(b), etc. which will be explained later.

Figure 1:
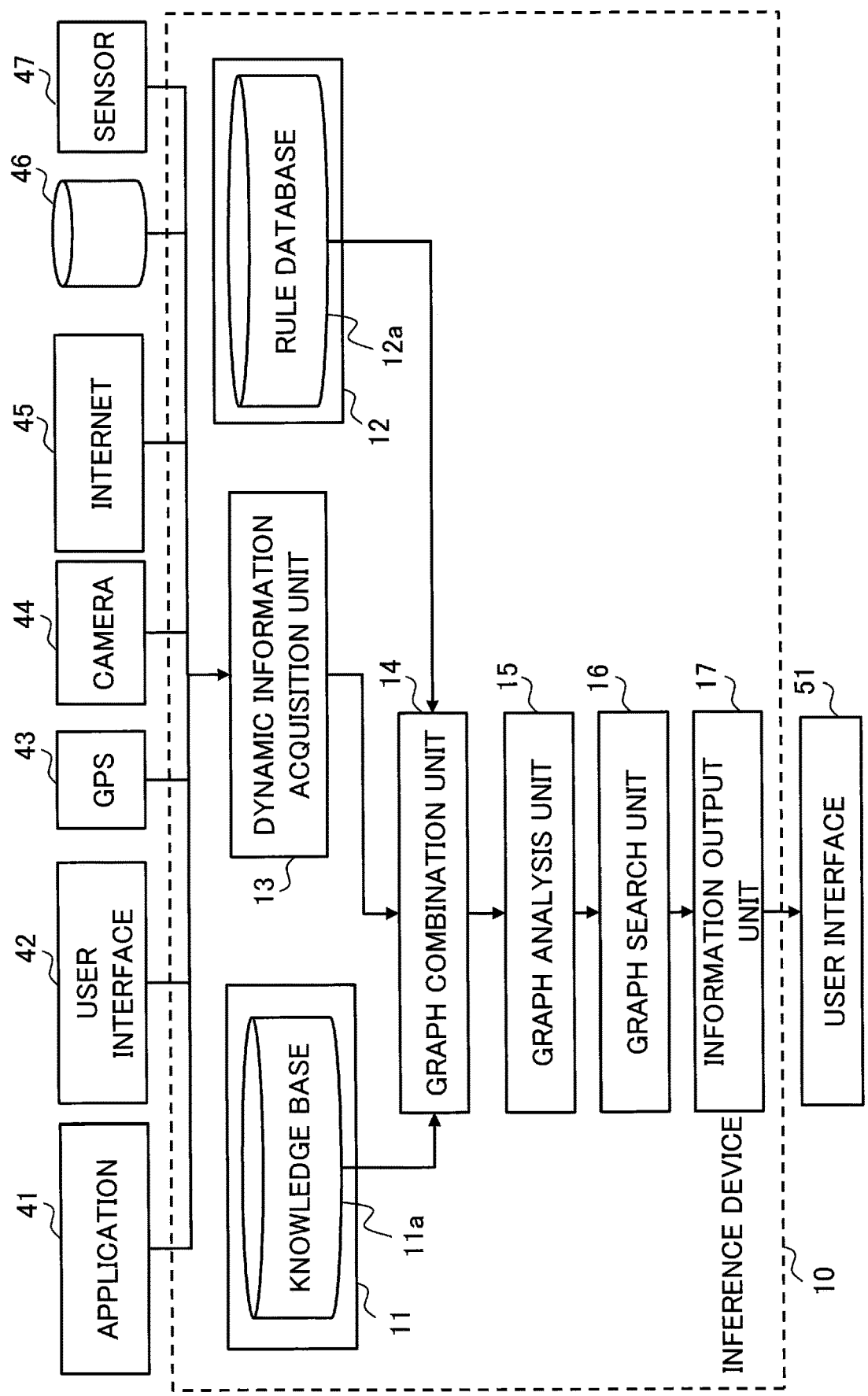
FIG. 1 is a functional block diagram schematically showing a configuration of an inference device according to a first embodiment of the present invention.

FIG. 1 is a functional block diagram schematically showing a configuration of an inference device 10 according to the first embodiment. The inference device 10 is a device capable of executing an inference method according to the first embodiment. As shown in FIG. 1, the inference device 10 includes a graph combination unit 14 as an information combination unit. Further, the inference device 10 may include a knowledge base unit 11 storing a knowledge base 11a, a rule database unit 12 storing a rule database 12a, a dynamic information acquisition unit 13, the graph combination unit 14 as the information combination unit, a graph analysis unit 15 as an information analysis unit, a graph search unit 16 as an information search unit, and an information output unit 17.

The knowledge base unit 11 is a storage device that stores the knowledge base 11a made up of knowledge information. The knowledge base unit 11 is a part of the inference device 10. However, the knowledge base unit 11 may also be installed in an external device connected to the inference device 10 to be able to perform communication with the inference device 10.

The rule database unit 12 is a storage device that stores a plurality of rules (hereinafter referred to also as "inference rules") for combining (i.e., connecting) a plurality of graphs. The rule database unit 12 is a part of the inference device 10. However, the rule database unit 12 may also be installed in an external device connected to the inference device 10 to be able to perform communication with the inference device 10.

The dynamic information acquisition unit 13 acquires external information that changes dynamically. The dynamic information acquisition unit 13 acquires information dynamically changing from moment to moment, converts the acquired information to information in a predetermined format, and outputs the converted information. The external information is acquired from an external device, an application executed by an external device, or the like. The external information is acquired from, for example, an application 41, a user interface 42, a GPS (Global Positioning System) 43, a camera 44, the Internet 45, an external database 46, a sensor 47 or the like. The application 41 is software operating on a device such as a computer or a mobile information terminal.

The graph combination unit 14 generates the integrated graph, in which a plurality of items of information have been integrated, by dynamically combining graphs (hereinafter referred to also as "semantic graphs", "data structures" or "knowledge graphs") based on the knowledge information provided from the knowledge base 11a, the inference rules provided from the rule database 12a, and the external information acquired by the dynamic information acquisition unit 13.

The graph analysis unit 15 analyzes the integrated graph generated by the graph combination unit 14 and thereby calculates importance levels of nodes as components of the integrated graph. The importance level of each node is, for example, a probability of arriving at each node, that is, an arrival probability of each node, in a stationary state reached by infinitely performing a random walk on the integrated graph.

The graph search unit 16 searches the integrated graph analyzed by the graph analysis unit 15 for desired information by using the importance levels calculated by the graph analysis unit 15. The desired information is, for example, a particular information pattern in the integrated graph analyzed by the graph analysis unit 15.

The information output unit 17 outputs the desired information found by the graph search unit 16 to a user interface 51.

The user interface 51 is, for example, a speaker as an audio output device for outputting audio, a display as an image output device for displaying images, or the like. The user interface 51 provides the user with the desired information found by the graph search unit 16 by using audio, image or the like.

Figure 2:
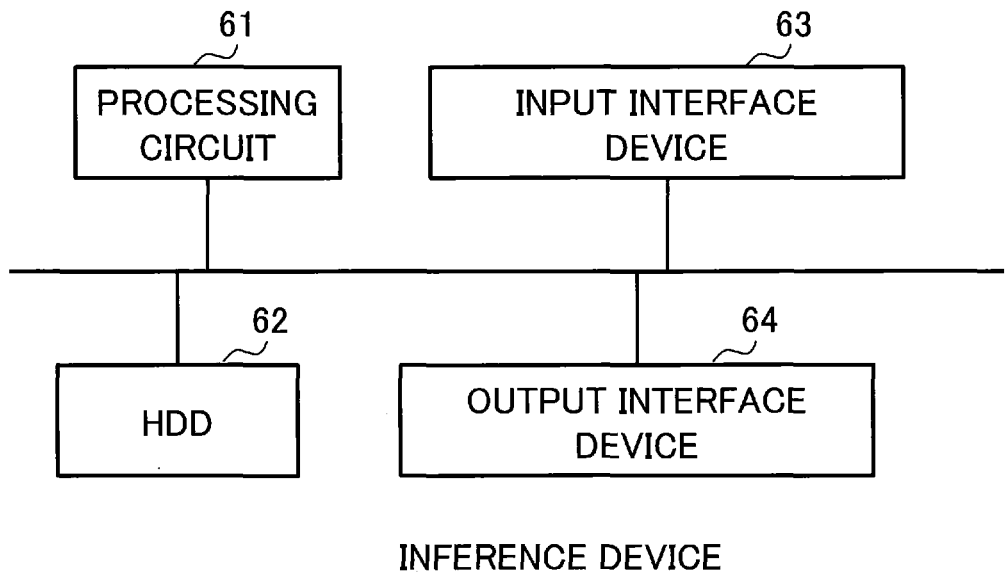
FIG. 2 is a diagram showing an example of a hardware configuration of the inference device according to the first embodiment.

FIG. 2 is a diagram showing an example of a hardware configuration of the inference device 10 according to the first embodiment. In the example of FIG. 2, the inference device 10 includes a processing circuit 61, a hard disk drive (HDD) 62 as a storage device, an input interface device 63 and an output interface device 64. The processing circuit 61 is, for example, a semiconductor integrated circuit capable of implementing the functions of the dynamic information acquisition unit 13, the graph combination unit 14, the graph analysis unit 15, the graph search unit 16 and the information output unit 17 shown in FIG. 1. The input interface device 63 is, for example, a circuit that performs communication with an external device, software executed by an external device, or the like. The output interface device 64 is, for example, a circuit that performs communication with an external device, software executed by an external device, or the like.

The processing circuit 61 is dedicated hardware, for example. The processing circuit 61 can also be, for example, a single circuit, a combined circuit, a processor executing a program, a processor executing parallel programs, an ASIC (Application Specific Integrated Circuit), an FPGA (Field Programmable Gate Array), or a combination of some of these types of circuits.

Figure 3:
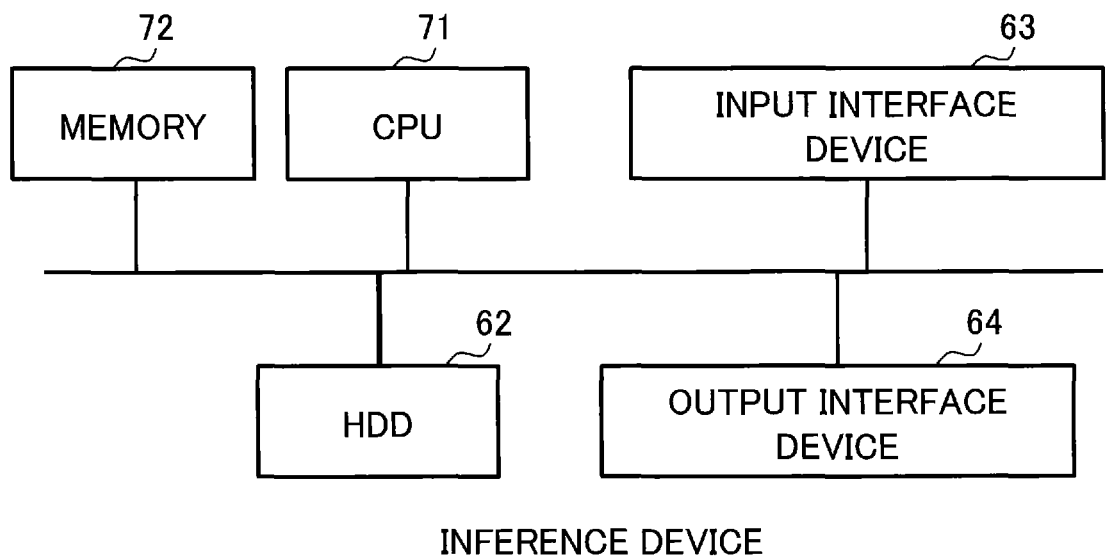
FIG. 3 is a diagram showing another example of the hardware configuration of the inference device according to the first embodiment.

FIG. 3 is a diagram showing another example of the hardware configuration of the inference device 10 according to the first embodiment. In FIG. 3, each component identical or corresponding to a component shown in FIG. 2 is assigned the same reference character as that shown in FIG. 2. In the example of FIG. 3, the inference device 10 includes a CPU (Central Processing Unit) 71 as a processor working as an information processing unit, a memory 72 as a storage device for storing a program, the HDD 62 as a storage device, the input interface device 63 and the output interface device 64. The memory 72 is capable of storing an inference program according to the first embodiment. The CPU 71 is capable of implementing the functions of the dynamic information acquisition unit 13, the graph combination unit 14, the graph analysis unit 15, the graph search unit 16 and the information output unit 17 shown in FIG. 1 by executing the inference program stored in the memory 72 as a non-transitory computer-readable storage medium.

The CPU 71 may include a plurality of cache memories such as a primary cache memory and a secondary cache memory. A program stored in the HDD 62, the memory 72 or the like makes a computer execute a method or a procedure of a process to be executed by the inference device 10. The memory 72 is, for example, a nonvolatile or volatile semiconductor memory such as a RAM (Random Access Memory), a ROM (Read Only Memory), a flash memory, an EPROM (Erasable Programmable Read Only Memory) or an EEPROM (Electrically Erasable Programmable Read Only Memory).

In FIG. 2 and FIG. 3, the HDD 62 can be used for storing the learning data. It is also possible to store the learning data in an optical storage device using an optical disc such as a DVD (Digital Versatile Disc), a semiconductor memory, an external storage device, or the like.

Incidentally, the inference device 10 may also be configured to implement part of its functions by dedicated hardware and implement other part of the functions by software or firmware. For example, it is possible to implement the function of the dynamic information acquisition unit 13 by a processing circuit as dedicated hardware and implement the functions of components other than the dynamic information acquisition unit 13 by a CPU as a processor executing a program stored in a memory.

(1-2) Operation (1-2-1) Outline of Operation

Figure 4:
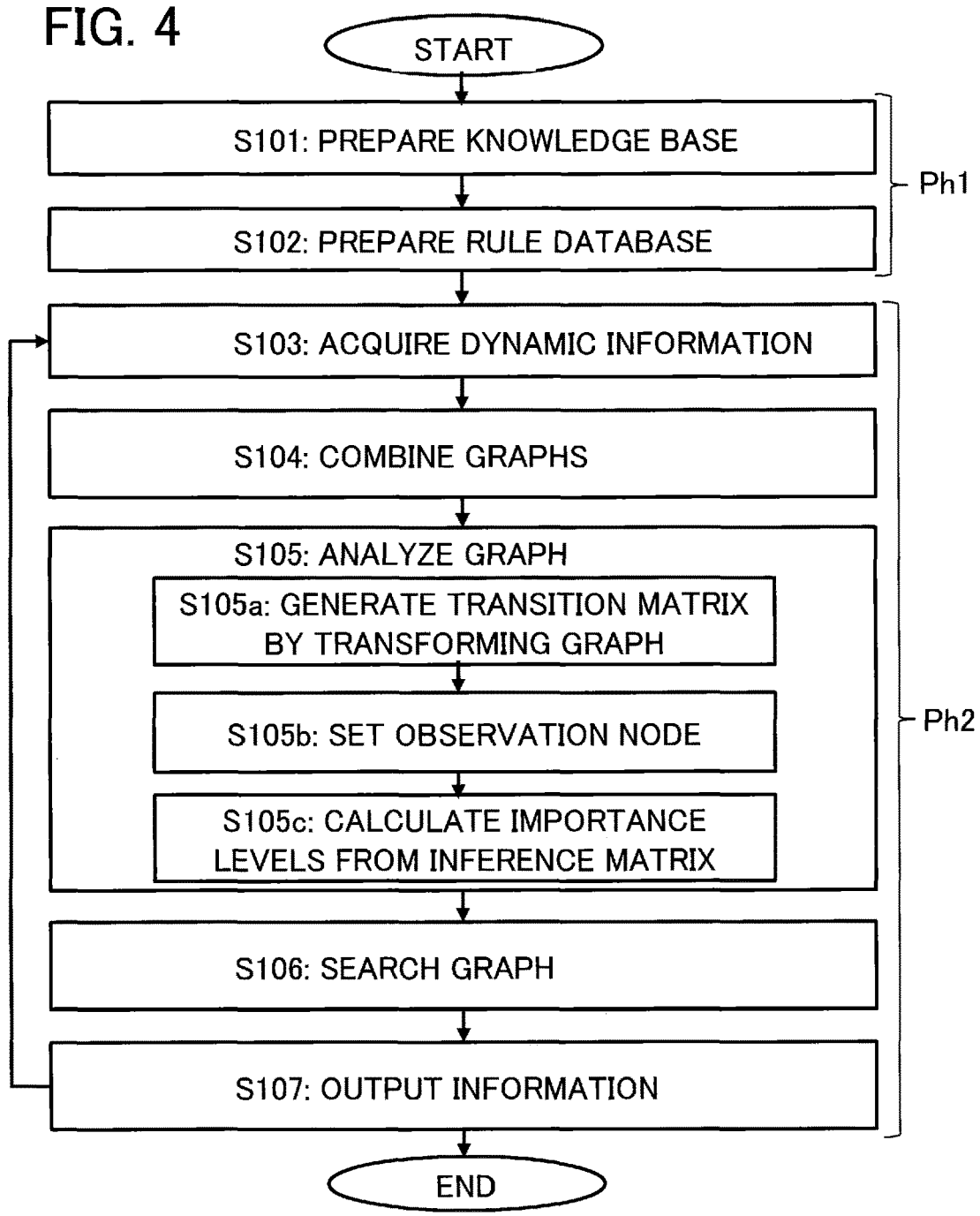
FIG. 4 is a flowchart showing the operation of the inference device according to the first embodiment.

FIG. 4 is a flowchart showing the operation of the inference device 10 according to the first embodiment. The operation of the inference device 10 includes advance preparation as an operation in a phase Ph1 and execution of an inference as an operation in a phase Ph2.

The phase Ph1 includes preparation of the knowledge base 11*a* as a process in step S101 and preparation of the rule database 12*a* as a process in step S102. It is permissible even if the whole or part of the process in the phase Ph1 is performed by a device other than the inference device 10.

The phase Ph2 includes acquisition of dynamic information as a process in step S103, combination of graphs as a process in step S104, analysis of the integrated graph as a process in step S105, search of the integrated graph as a process in step S106, and outputting of information as a process in step S107. The combination of graphs as the process in the step S104 is performed by using the knowledge base 11*a* and the rule database 12*a* prepared in advance.

(1-2-2) Step S101: Preparation of Knowledge Base 11*a*

First, the knowledge base 11*a* storing a variety of knowledge information to be used for making the inference device 10 operate is generated. The knowledge base 11*a* is stored in the knowledge base unit 11.

The format of the information stored as the knowledge base 11*a* is RDF (Resource Description Framework), for example. RDF is a standardized framework for representing information (resource) existing on the Internet. In RDF, data is represented by using a triplet, i.e., a set of three items, made up of a subject, a predicate and an object.

Further, RDFS (RDF Schema) is a standardized vocabulary definition for representing a resource. In an example Y1 shown in Table 2, a fact that a ramen (or ramen noodle) class as a subject is a food class as an object is represented by using one triplet, by using a predicate "rdfs:subClassOf" defined in RDFS. Here, the "ramen class" means a substance that belongs to ramen. The "food class" means a substance that belongs to food.

TABLE 2

EXAMPLE Y1 OF RDF REPRESENTATION

| SUBJECT | PREDICATE | OBJECT |
| --- | --- | --- |
| ramen class | rdfs:subClassOf | food class |

FIG. 5 is a diagram showing the example Y1 of the RDF representation by using a directed graph. As shown in FIG. 5, in the RDF representation, the subject and the object are represented as apices, i.e., nodes, and the predicate is represented as a side, i.e., an edge. In the RDF representation, the triplet made up of the subject, the predicate and the object is represented as a directed graph including a node as the subject, a node as the object and an arrow as the predicate, that is, an arrow as an edge heading from the subject to the object.

In the present application, for example, a triplet made up of a subject A0, a predicate B0 and an object C0 is described by using parentheses as below.

(A0, B0, C0)

The knowledge information stored as the knowledge base 11*a* is, for example, equipment information, common sense (i.e., common knowledge) information, general knowledge information, ontology of these items of information, etc. The knowledge information stored as the knowledge base 11*a* can include two or more types of information among the equipment information, the common sense information, the general knowledge information, the ontology of these items of information, etc.

The "equipment information" is information regarding equipment. The equipment information is, for example, a property of the equipment, the name of the equipment, the type of the equipment, setting items of the equipment, numerical ranges of the setting items of the equipment, restriction on usage of the equipment, the usage count of the equipment, the method of usage of the equipment, etc. The property of the equipment can include, for example, an air conditioner class, an electric fan class, a music player class, or the like.

The "common sense information" is information regarding general knowledge of humans. The common sense information is, for example, a human's sense of value, a human's thought, a human's action, a human's condition, or the like. The common sense information includes information regarding a human's condition and information regarding a human's action. The information regarding a human's condition includes information regarding a human's physical condition and information regarding a human's psychological condition. The information regarding a human's condition can include, for example, information indicating that a human is feeling hot, a human is feeling cold, a human is annoyed, a human is laughing, or the like. The information regarding a human's action can include, for example, information indicating that a human drives a vehicle, eats, sleeps, searches for something, goes to a particular place, or the like.

An example F1 of the common sense information in the knowledge base 11a is shown below.

F1=(hot, then, eat cold food).

The example F1 of the common sense information represents knowledge "If it's hot, a human eats cold food." by using one triplet of (subject, predicate, object). The description "then" (predicate) in the triplet in the example F1 is defined as a description meaning that "When a human is in a condition of (subject), the action the human takes next is an action of (object).". Therefore, the triplet in the example F1 indicates that "When a human is in a condition of "hot" (subject), the action that the human takes next is an action of "eating cold food" (object).".

Examples F2a and F2b of the common sense information in the knowledge base 11a are shown below.

F2a=(eat cold food, slot, cold food class).

F2a=(eat cold food, subAct, eat).

The examples F2a and F2b of the common sense information represent knowledge "The target of the action "eating cold food" is a "cold food class", and an action as a superordinate concept of the action "eating cold food" is "eating"." by using two triplets each including (subject, predicate, object). The description "slot" (predicate) in the example F2a is defined as a description meaning that "A substance as the target of the action of (subject) is a substance of (object).". The description "subAct" (predicate) in the example F2b is defined as a description meaning that "An action as a superordinate concept of (subject) is an action of (object).".

Incidentally, the common sense information that is used may vary depending on a domain such as a region, a gender or an application as the target of the inference. Namely, the common sense information in the knowledge base 11a used by the inference device 10 may be switched to one type of common sense information among a plurality of types of common sense information depending on a person or a field targeted by the inference device 10.

The "general knowledge information" is information regarding universal facts. The "general knowledge information" can include information regarding engineering, physics, science, biology, medicine, food, geography, religion, economy, politics, history, famous figures, and so forth.

An example G1 of the general knowledge information in the knowledge base 11a is shown below.

G1=(ice cream, rdfs:subClassOf, cold food class).

The description "rdfs:subClassOf" (predicate) in the example G1 of the general knowledge information is defined as a description meaning that "A substance of (subject) is a subclass of a substance of (object).". The example G1 represents knowledge "Ice cream (subject) is a subclass of cold food (object)." by using one triplet of (subject, predicate, object).

An example G2 of the general knowledge information in the knowledge base 11a is shown below.

G2=(strawberry ice cream, instanceOf, ice cream class).

The description "instanceOf" (predicate) in the example G2 of the general knowledge information is defined as a description meaning that "A substance of (subject) is an instance of (object).". The example G2 represents knowledge "Strawberry ice cream (subject) is an instance (actual condition) of an ice cream class (object)." by using one triplet of (subject, predicate, object).

The aforementioned ontology means words, a relationship between a word and another word, a class, a property, a constraint, etc. in the targeted domain.

The ontology is, for example, information listed below.

The predicate "slot" means that "A substance as the target of the action of (subject) is (object).".

A subject that the predicate "slot" can take is a word regarding an action.

An object that the predicate "slot" can take is a word regarding the class of the object.

FIG. 6 is a diagram showing an example of the knowledge base 11a in the first embodiment in tabular form (Table 3).

(1-2-3) Step S102: Preparation of Rule Database 12a

Subsequently, one or more inference rules to be used for making the inference device 10 operate are prepared as the rule database 12a. The rule database 12a is stored in the rule database unit 12. The prepared inference rules are used for integrating multiple items of information into one item of information by combining items of information respectively belonging to multiple domains different from each other, generating a new hypothesis from external information acquired from a sensor or the like, and so forth.

In order to combine items of information respectively belonging to multiple domains different from each other, the information regarding a human's condition and the information regarding a human's action may be used, for example. For example, the following inference rule examples W1 and W2 may be stored in the rule database 12a.

The inference rule example W1 is "If the air temperature outside the vehicle is higher than or equal to 30° C., conditions of the outside of the vehicle and the driver are hot.". The inference rule example W1 has a function of combining outside-vehicle air temperature information acquired by a temperature sensor and information regarding a human's condition.

The inference rule example W2 is "When the present time is 7 a.m., 12 p.m. or 5 p.m., the present time relates to an action of "eating".". The inference rule example W2 has a function of combining time information as the present time acquired by a clock and information regarding a human's action.

Further, the inference rule can also be a rule for generating a new hypothesis by using information inputted from the outside. For example, when voices uttered by a human can be collected by using a microphone, the following inference rule examples W3 to W5 may be stored as the rule database 12a.

The inference rule example W3 is "When a human says "I'm full.", the human ate something just before in a restaurant.".

The inference rule example W4 is "When a human says "I'm full.", the human ate something just before in a vehicle.".

The inference rule example W5 is "When a human says "I'm full.", the human ate something just before in a house.".

(1-2-4) Step S103: Acquisition of Dynamic Information

The dynamic information acquisition unit 13 acquires information dynamically changing from moment to moment, converts the acquired information to information in a format common with the knowledge base 11a, and outputs the converted information.

The timing for the dynamic information acquisition unit 13 to acquire information is at constant time intervals, for example. The timing for the dynamic information acquisition unit 13 to acquire information may also be different timing. The timing for the dynamic information acquisition unit 13 to acquire information may be, for example, immediately after an information acquisition command inputted by the user is received by the dynamic information acquisition unit 13. Further, the timing for the dynamic information acquisition unit 13 to acquire information may also be a particular time. The particular time is, for example, when twelve noon comes around, when a vehicle enters a particular urban area, or the like. Furthermore, the timing for the dynamic information acquisition unit 13 to acquire information may also be each time a plurality of conditions is satisfied at the same time, such as when a particular time of day comes around at a position for acquiring information, when a particular event occurs at a position for acquiring information, or the like.

The information acquired by the dynamic information acquisition unit 13 is, for example, sensor information, application information, the user's personal information, user command information and other information, or the like. The information acquired by the dynamic information acquisition unit 13 is referred to also as external information.

The sensor information is, for example, information on user operations or information on speech acquired by the user interface 42 such as a touch panel, a microphone or the like. Further, the sensor information may also be a result of sensing regarding the outside world or a human acquired by the camera 44 or various types of sensors. The various types of sensors can include, for example, a thermometer, a hygrometer, etc. Furthermore, the sensor information may also be position information acquired by the GPS 43 or the like.

In a case where a vehicle is taken as an example, the sensor information is information acquired by a visible light camera or an infrared camera installed in the vehicle, for example. The sensor information may be, for example, information indicating the result of detecting the driver's face and eye positions. The camera 44 can also be a plurality of cameras installed in the vehicle. Alternatively, the sensor information may be voice information indicating voice uttered by the driver or a passenger acquired by a microphone installed in the vehicle. Further, the sensor information may also be information acquired by a biological sensor, a pressure-sensitive sensor or the like. The biological sensor can include a motion sensor, a blood pressure sensor, an electrocardiogram sensor, a heart rate sensor or the like.

For example, when the dynamic information acquisition unit 13 acquires information "The outside-vehicle temperature is 35° C." and information "The outside-vehicle humidity is 90%." from a temperature sensor and a humidity sensor, the dynamic information acquisition unit 13 converts these items of information into the following triplet examples J1 and J2 each made up of (subject, predicate, object):

J1=(outside-vehicle condition, temperature, 35° C.), and
J2=(outside-vehicle condition, humidity, 90%).

When the dynamic information acquisition unit 13 acquires information "The present time is 12 p.m . . . " as present time information acquired from a clock, the dynamic information acquisition unit 13 converts the information into the following triplet example J3 made up of (subject, predicate, object):

J3=(present time, is, 12 p.m.).

The application information acquired by the dynamic information acquisition unit 13 includes, for example, information acquired by an application operating in the user's environment, usage status of the application, usage history of the application, a screen currently displayed by the application, options currently displayed by the application, and so forth.

When the dynamic information acquisition unit 13 acquires information on nearby shops by using an application of a car navigation system and "A shop named "ice cream shop #6" near here is found.", the dynamic information acquisition unit 13 converts the information into the following triplet example J4 made up of (subject, predicate, object):

J4=(nearby shop, has, ice cream shop #6).

The user command information acquired by the dynamic information acquisition unit 13 is, for example, the contents of a command explicitly or implicitly issued by the user to an inference system including the inference device 10, or the like.

For example, when "The user performed button operations and thereby started up the air conditioner and decreased the temperature.", the dynamic information acquisition unit 13 converts the information into the following triplet example J5 made up of (subject, predicate, object):

J5=(most recent command, is, decrease temperature).

The user's personal information acquired by the dynamic information acquisition unit 13 is, the user's name, the user's family, the user's taste, or the like.

For example, the dynamic information acquisition unit 13 converts information "The name of the driver is Taro Tokyo and the driver likes ramen in general." into the following two triplet examples J6 and J7 each made up of (subject, predicate, object):

J6=(driver, name, Taro Tokyo), and
J7=(driver, like, ramen class).

The external information acquired by the dynamic information acquisition unit 13 includes, for example, weather information, news, geographical information, etc. acquired from the Internet 45. Further, the external information acquired by the dynamic information acquisition unit 13 may include information provided from a country, a municipality, a company, an individual, etc. and stored in the external database 46, or the like.

FIG. 7 is a diagram showing an example of data generated by the dynamic information acquisition unit 13 of the inference device 10 according to the first embodiment in tabular form (Table 4). The example of Table 4 includes outside-vehicle condition, car navigation information, present time, command information and driver information.

(1-2-5) Step S104: Combination of Graphs

Subsequently, the graph combination unit 14 combines a plurality of graphs together by successively applying inference rules stored as the rule database 12a to the knowledge base 11a and the output of the dynamic information acquisition unit 13 by means of forward chaining, for example, and finally generates one integrated graph made up of a plurality of graphs combined together. The plurality of graphs constituting the integrated graph are directed graphs, for example.

The application of the inference rules in the rule database 12a can be represented by using a graph as follows:

"When a particular information pattern is found in a targeted graph, a node or edge is added/changed/deleted to/in/from the graph."

A concrete example of the combination of graphs will be described below by using the aforementioned inference rule examples W1 and W2. In the following description, "?x" represents an arbitrary variable.

"If the air temperature outside the vehicle is higher than or equal to 30° C., conditions of the outside of the vehicle and the driver are hot." as the inference rule example W1 can be represented by using a graph as follows:

"When an information pattern of a triplet (outside-vehicle condition, temperature, ?x) is found in the targeted graph and a condition "?x≥30" is satisfied,
   a triplet (outside-vehicle condition, status, hot) and
   a triplet (driver, status, hot)
   are newly added to the graph."

FIGS. 8(a) and 8(b) are diagrams showing how the graph combination unit 14 of the inference device 10 according to the first embodiment generates a directed graph by using a forward chaining rule as an inference rule stored in the rule database 12a.

"When the present time is 7 a.m., 12 p.m. or 5 p.m., the present time relates to an action of "eating"." as the inference rule example W2 can be represented by using a graph as follows:

"When an information pattern of a triplet (present time, is, ?x) is found in the targeted graph and a condition "?x=7 a.m., "?x=12 p.m." or "?x=5 p.m." is satisfied, a triplet (present time, relate, eat) is newly added to the graph."

Figure 9:
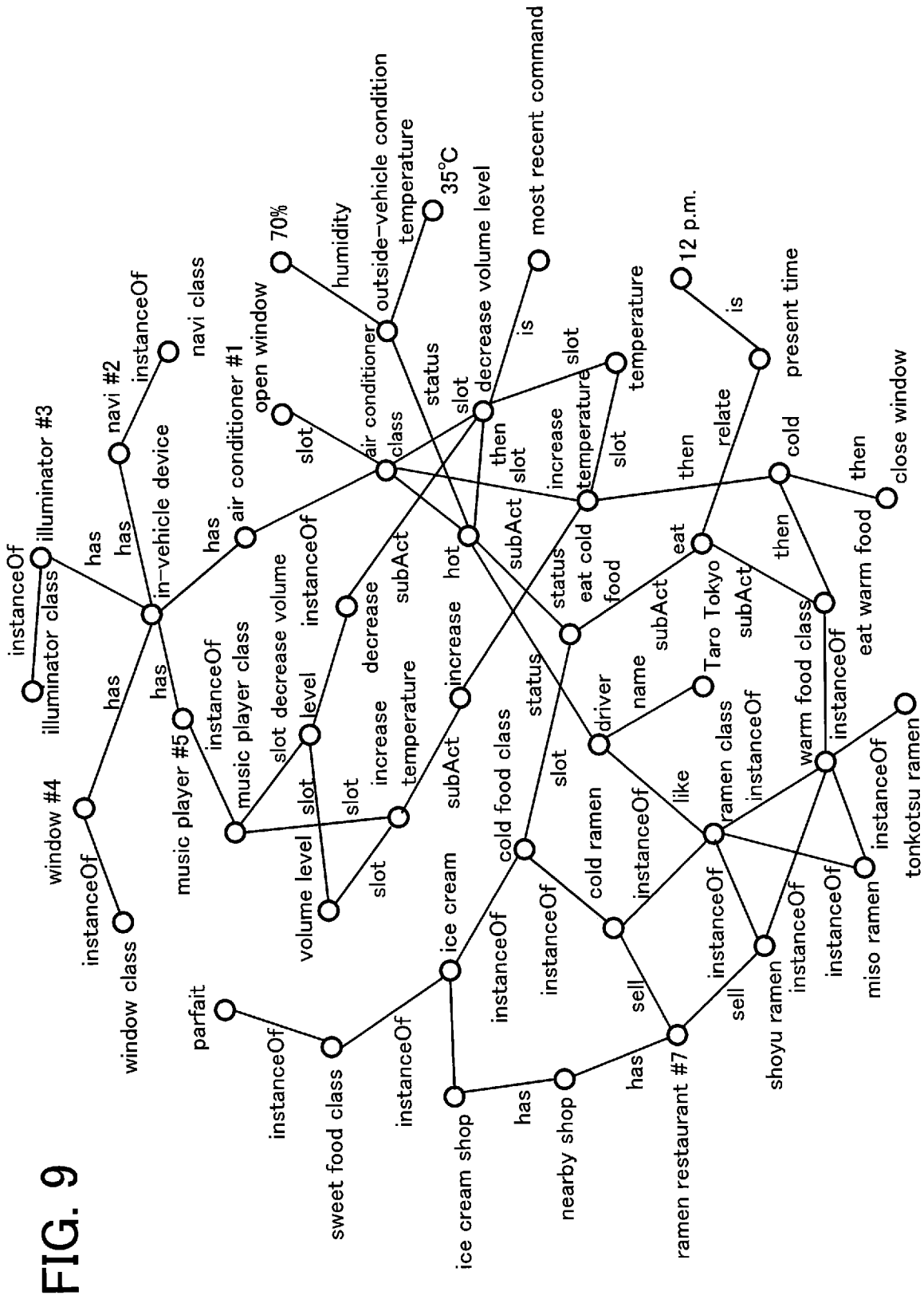
FIG. 9 is a diagram showing an example of a graph obtained by successively applying a forward chaining rule as an inference rule to a graph representing the knowledge base shown in Table 3 (FIG. 6) and Table 4 (FIG. 7)

For example, by successively applying the inference rule examples W1 and W2 to a graph representing Table 3 shown in FIG. 6 and Table 4 shown in FIG. 7 by means of forward chaining, a graph like the one shown in FIG. 9 is obtained. The graph in FIG. 9 is just an example for illustration.

As above, the graph combination unit 14 is capable of generating one integrated graph like the one shown in FIG. 9 from information acquired from sensors or items of information respectively belonging to multiple domains different from each other. Namely, the graph combination unit 14 is capable of generating integrated information by combining items of information respectively belonging to multiple domains different from each other by successively applying rules by means of forward chaining. Further, the integrated information can be represented as an integrated graph.

Furthermore, especially, the graph combination unit 14 is capable of using the information regarding a human's condition and the information regarding a human's action, for example, for combining items of information respectively belonging to multiple domains different from each other. The information regarding a human's condition is, for example, "hot", "cold", "hungry", etc. The information regarding a human's action is, for example, "decrease temperature", "increase temperature", "eat cold food", etc.

For example, by applying the inference rule example W1, it is possible to combine information "outside-vehicle condition" in a sensor domain and information "cold ramen" in a food domain, i.e., items of information respectively belonging to multiple domains different from each other.

Specifically, with triplets K1 to K4 each made up of (subject, predicate, object), "outside-vehicle condition" and "cold ramen" can be combined together by using a directed graph.
   K1=(outside-vehicle condition, status, hot).
   K2=(hot, then, eat cold food).
   K3=(eat cold food, slot, cold food class).
   K4=(cold ramen, instanceOf, cold food class).

(1-2-6) Step S105: Graph Analysis

Figure 10A:
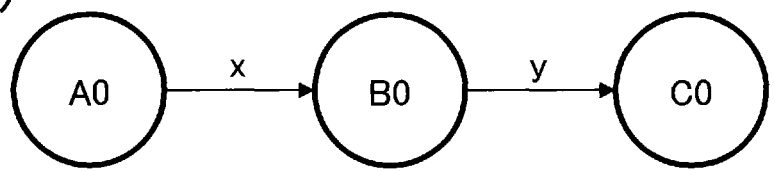
FIGS. 10(a) to 10(c) are diagrams showing deductive reasoning, inductive reasoning and abductive reasoning as graphs.
Figure 10B:
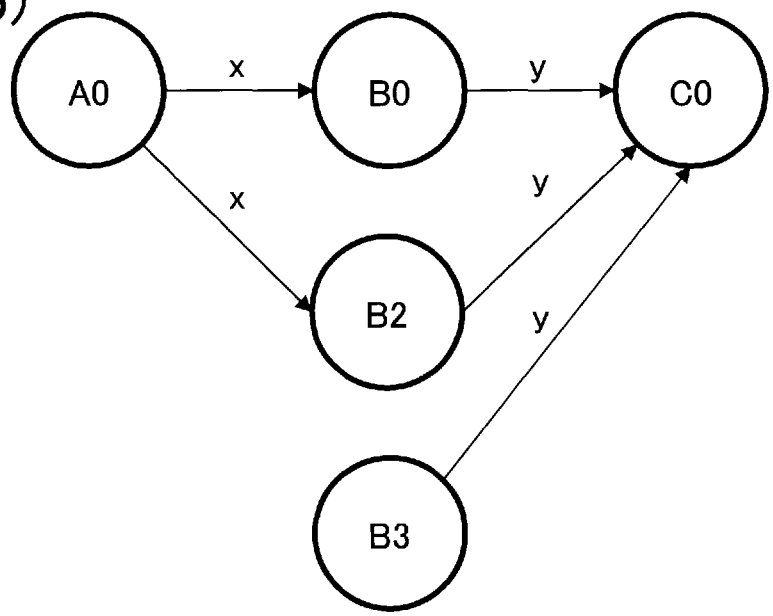
Figure 10C:
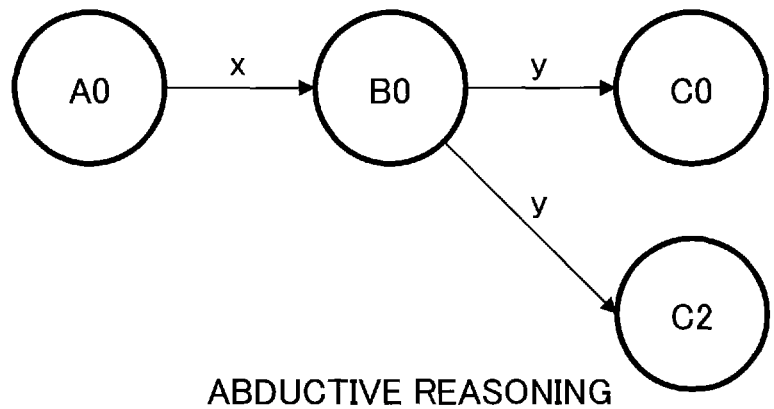

Subsequently, the graph analysis unit 15 executes probabilistic inference by tracing nodes of the integrated graph (e.g., FIG. 9) generated by the combination of graphs by the graph combination unit 14 through edges, and calculates the importance level of each node as the result of the inference. By tracing nodes on the integrated graph, the graph analysis unit 15 executes deductive reasoning (deduction), inductive reasoning (induction) and abductive reasoning (abduction). FIGS. 10(a) to 10(c) are diagrams showing the deductive reasoning, the inductive reasoning and the abductive reasoning as graphs.

For example, when there are a triplet (A0, x, B0) and a triplet (B0, y, C0) as in the graph shown in FIG. 10(a), it is possible to deductively infer the node C0 from the node A0 by tracing the graph.

Specifically, when there are a triplet (Socrates, is, human) and a triplet (human, is, die), it is possible to infer the node "die" from the node "Socrates" and obtain "Socrates dies." as a conclusion.

Further, for example, when there are a triplet (A0, x, B0), a triplet (A0, x, B2), a triplet (B0, y, C0), a triplet (B2, y, C0) and a triplet (B3, y, C0) as in the graph shown in FIG. 10(b), it is possible to inductively infer the node B3 from the node A0 by tracing the graph from the node A0 to the node C0 via the node B0 or B2 and finally reversely tracing the graph from the node C0 to the node B3.

Specifically, let us discuss here a case where the graph includes
   a triplet (Taro-san, like, shoyu ramen),
   a triplet (Taro-san, like, tonkotsu ramen),
   a triplet (shoyu ramen, rdfs:subClassOf, ramen class),
   a triplet (tonkotsu ramen, rdfs:subClassOf, ramen class) and
   a triplet (miso ramen, rdfs:subClassOf, ramen class).

In this case, the node "Taro-san" and the node "miso ramen" are not directly connected to each other in the graph. However, the node "Taro-san" likes the node "shoyu ramen" (soy sauce ramen) and the node "tonkotsu ramen" (pork bone broth ramen), and thus likes "ramen class" which means ramen in general. Then, the node "Taro-san" also likes the node "miso ramen" (soybean paste ramen). To sum up, such inductive reasoning is possible.

Further, when an event as a triplet (A0, x, B0) has occurred as in the graph shown in FIG. 10(c), for example, it is possible to infer a hypothesis of the node C0 or the node C2 from the node A0 by tracing the graphs of the triplet (B0, y, C0) and the triplet (B0, y, C2).

Specifically, when there are
   an event as a triplet (Hanako-san, action at 12 p.m., ate lunch),
   a triplet (ate lunch, next action, take a nap) and
   a triplet (ate lunch, next action, take a walk),
   it is possible to infer two hypotheses (i.e., theories of which it is unclear which one is correct): a hypothesis "The next action of Hanako-san is taking a nap." and a hypothesis "The next action of Hanako-san is taking a walk.". Such an inference is referred to also as abductive reasoning.

The graph (e.g., FIG. 9) generated by the graph combination unit 14 is a circulatory graph in which nodes are connected in a complex manner. Thus, in the integrated graph (e.g., FIG. 9) generated by the graph combination unit 14, it is impossible to determine one inference result by just tracing the integrated graph in a simple way as in FIGS. 10(a) to 10(c). Therefore, the probability of arriving at each node, that is, the arrival probability, in a stationary state reached by infinitely performing a random walk on the integrated graph (e.g., FIG. 9) generated by the graph combination unit 14 is calculated, for example. This probability can be interpreted as "the probability that the node is the conclusion of the inference", and thus is defined as the importance level of each node. Further, performing a random walk on the integrated graph is equivalent to stochastically executing deductive reasoning, inductive reasoning and abductive reasoning.

Next, a description will be given of the contents of steps S105a, S105b and S105c, i.e., the step S105 shown in FIG. 4, indicating a concrete calculation method of the graph analysis unit 15.

(Step S105a: Transformation of Graph and Generation of Transition Matrix)

The graph analysis unit 15 generates an inter-node transition matrix for the random walk by properly transforming the integrated graph inputted to the graph analysis unit 15.

First, a graph L2 is newly generated depending on the type of a verb in each triplet included in a graph L1 inputted to the graph analysis unit 15. The graph L2 generated by the graph analysis unit 15 is referred to also as an "inference graph". In the generation of the inference graph, one of the following transformation pattern TP1, transformation pattern TP2 and transformation pattern TP3 is employed, for example:

In the "transformation pattern TP1", the directed graph as the inputted graph L1 is directly used as the inference graph L2.

In the "transformation pattern TP2", the graph L2 is generated by transforming the directed graph as the inputted graph L1 into a non-directed graph, that is, a bidirectional graph.

In the "transformation pattern TP3", the graph L2 is generated by transforming the directed graph as the inputted graph L1 into a reverse direction directed graph.

Subsequently, an adjacency matrix of the inference graph L2 is generated, and an inter-node transition matrix P, in which the sum total value of each column of the adjacency matrix is normalized to 1, is obtained. Assuming that the number of nodes is N (N: positive integer), the inter-node transition matrix P is a matrix in a size of (N×N).

Here, each element P(i, j) of the transition matrix P represents a probability of transition from the j-th node to the i-th node in the random walk on the integrated graph. For example, when a certain node A5 is a subject and nodes connected to the node A5 are four nodes A6 to A9, the probability of transition from the node A5 to each of the nodes A6 to A9 is set at 0.25 as a uniform value. However, the probability of transition from the node A5 to each of the nodes A6 to A9 does not need to be a uniform value. The transition probabilities that are set may also be values different from each other.

When the inference graph L2 is generated by transforming the directed graph as the inputted graph L1 into a non-directed graph as shown in the transformation pattern TP2, the following advantages are obtained:

For example, in the case of a triplet (hot, then, eat cold food), it is possible to infer that (someone) "eats cold food" if it's "hot", or it is also possible to reversely infer that it's "hot" if (someone) "eats cold food" by tracing the graph in the reverse direction. Further, as in the example of inductive reasoning shown in FIG. 10(b), it is possible to obtain an inference conclusion by tracing the graph from the node C0 to the node B3, that is, in the reverse direction.

For example, in a triplet (j, x, i), the initial setting of the transition probabilities of the elements P(i, j) and the elements P(j, i) of the transition matrix P is as follows:

$P(i,j)=\alpha$ (0<α≤1), and $P(j,i)=0$.

However, when the graph L1 as a directed graph was transformed into the graph L2 as a non-directed graph according to the transformation pattern TP2, in the triplets of the transformed graph L2, the initial setting of the transition probabilities of the elements P(i, j) and the elements P(j, i) of the transition matrix P is as follows, for example:

$P(i,j)=P(j,i)=\alpha$ (0<α≤1).

Alternatively, the transition probabilities are provided with bias and set as follows:

$P(i,j)=\alpha$ (0<α≤1), and $P(j,i)=\beta$ (0<β≤1).

where α and β are not equal to each other. With such a setting, it is possible to freely come and go between the node i and the node j in a random walk process which will be described later.

Next, when the inference graph L2 is generated by transforming the directed graph as the inputted graph L1 into a reverse direction directed graph as shown in the transformation pattern TP3, the following advantages are obtained:

For example, let us consider a task of inferring what Taro-san likes in a case where there are a triplet (Taro-san, like, ramen) and a triplet (Taro-san, dislike, durian).

Suppose the aforementioned triplet (Taro-san, like, ramen) and triplet (Taro-san, dislike, durian) are directly used for the inference, there is a possibility that the importance levels of "ramen" and "durian" become approximately equal to each other in an importance level calculation step as the step S105c which will be described later. Therefore, in the verb "dislike", the directed graph is drawn in the reverse direction. This can reduce the probability of moving through "durian" in performing a random walk on the inference graph in the importance level calculation step which will be described later. Accordingly, this has an effect of decreasing the importance level of "durian".

Next, a description will be given below of a method of transforming the directed graph as the inputted graph L1 into a reverse direction directed graph as shown in the transformation pattern TP3.

Specifically, in the triplet (j, x, i), the initial setting of the transition probabilities is as follows:

$P(i,j)=\alpha$ (0<α≤1), and $P(j,i)=0$.

When the directed graph has been transformed into a reverse direction directed graph, the initial setting of the transition probabilities is as follows:

$P(i,j)=0$, and $P(j,i)=\alpha$ (0<α≤1).

(Step S105b: Setting of Observation Node)

The graph analysis unit 15 sets important nodes that serve as a starting point of an inference, such as information acquired from the outside or information detected by a sensor, as "observation nodes".

Subsequently, the graph analysis unit 15 generates an N-dimensional observation vector v in which the weights of the observation nodes are set at a value higher than or equal to 0 and the weights of the other nodes are set at 0. The observation vector v represents a probability distribution, and the sum total of elements of the observation vector v is 1.

For example, when "outside-vehicle condition", "nearby shop", "most recent command" and "driver" are set as the observation nodes, elements of the observation vector v corresponding to these nodes are respectively set at 0.25 (=¼). Elements of the observation vector v corresponding to the other nodes are set at 0.

In a process described later, restarting the random walk from an observation node has an effect of making the importance level of each node higher as the node is closer to the observation node.

(Step S105c: Calculation of Importance Level)

Subsequently, the graph analysis unit 15 obtains the importance level of each node included in the inference graph (graph L2) by using the transition matrix P and the observation vector v. Namely, the graph analysis unit 15 determines the starting point of the random walk based on the probabilities in the observation vector v, obtains the probability of arriving at each node by performing the random walk on the inference graph according to the transition matrix P, and regards the obtained arrival probability as the importance level of each node.

A concrete example of the calculation is as follows, for example: First, an inference matrix M, that is, M is defined as the following expression (1):

$$M = \alpha P + (1-\alpha)v1^T \quad (1).$$

Here, α represents a predetermined constant satisfying 0<α≤1.

P represents an N×N transition matrix, which is represented also as a transition matrix P.

v represents an observation vector of the N×1 size, which is represented also as an observation vector v.

$1^T$ represents a vector of the 1×N size whose elements are all 1, which is represented also as a vector $1^T$.

The first term of the right side of the expression (1) indicates that a random walk is performed on the integrated graph based on the transition matrix P. The second term of the right side of the expression (1) indicates that in the middle of the random walk, the random walk is started again from an observation node with a probability of (1−α).

Subsequently, an N-dimensional importance level vector is defined as $x_v$, that is, $x_v$, and this importance level vector is obtained by the following expression (2):

$$x_v = M x_v \quad (2).$$

The expression (2) indicates that the importance level vector $x_v$ has converged after repeating the random walk. An element $x_v(i)$ represents the importance level of the i-th node.

For the calculation of the importance level vector $x_v$ in the expression (2), the power method can be used. For example, for the calculation of the importance level vector $x_v$, it is possible to use a method similar to PageRank which is an algorithm for determining the importance level of a webpage. Further, for the calculation of the importance level vector $x_v$, it is possible to use a calculation method similar to PageRank described in Non-patent Reference 3.

Non-patent Reference 3: L. Page and three others, "The PageRank Citation Ranking: Bringing Order to the Web", Technical Report. Stanford InfoLab., 1998.

It is also possible to calculate a cost function CF1, that is, CF1 from the expression (1) and the expression (2) according to the following expression (3) and calculate the importance level of each node by obtaining an importance level vector $x_v$, whose sum total of elements is 1, that minimizes the value of the cost function:

$$CF1 = \left\| v - \frac{1}{1-\alpha}(x_N - \alpha P)x_v \right\|^2. \quad (3)$$

In the expression (3), E represents an N×N unit matrix, which is represented also as a unit matrix E. The vector v represents an observation vector of the N×1 size.

(1-2-7) Step S106: Search of Graph

In order to extract desired information, the graph search unit 16 searches the graph L2 for a particular information pattern by using the importance level vector $x_v$. A concrete operation example of the graph search unit 16 will be described below.

This description will be given by taking the dialog examples D1 and D2 shown in Table 1 as an example. In this example, the graph search unit 16 extracts an information pattern in which the subject, the predicate and the object respectively satisfy (?action, slot, ?slotClass) and
(?slotValue, instanceOf, ?slotClass)

from the integrated graph. Here, a character string starting from "?" is a variable, for which any character string can be used.

For example, in the example of Table 3 and Table 4, "satisfying a triplet (eat cold food, slot, cold food class) and a triplet (cold ramen, instanceOf, cold food class)" or "satisfying a triplet (decrease temperature, slot, air conditioner class) and a triplet (air conditioner #1, instanceOf, air conditioner class)" corresponds to the information pattern as the target of the search.

FIG. 11 is a diagram showing an example of data acquired by the graph search unit 16 of the inference device 10 according to the first embodiment by searching the integrated graph in tabular form (Table 5). Specifically, FIG. 11 shows the result of first sorting the graph search results by the importance level of "?action" and then sorting the graph search results by the importance level of "?slotValue".

Figure 12:
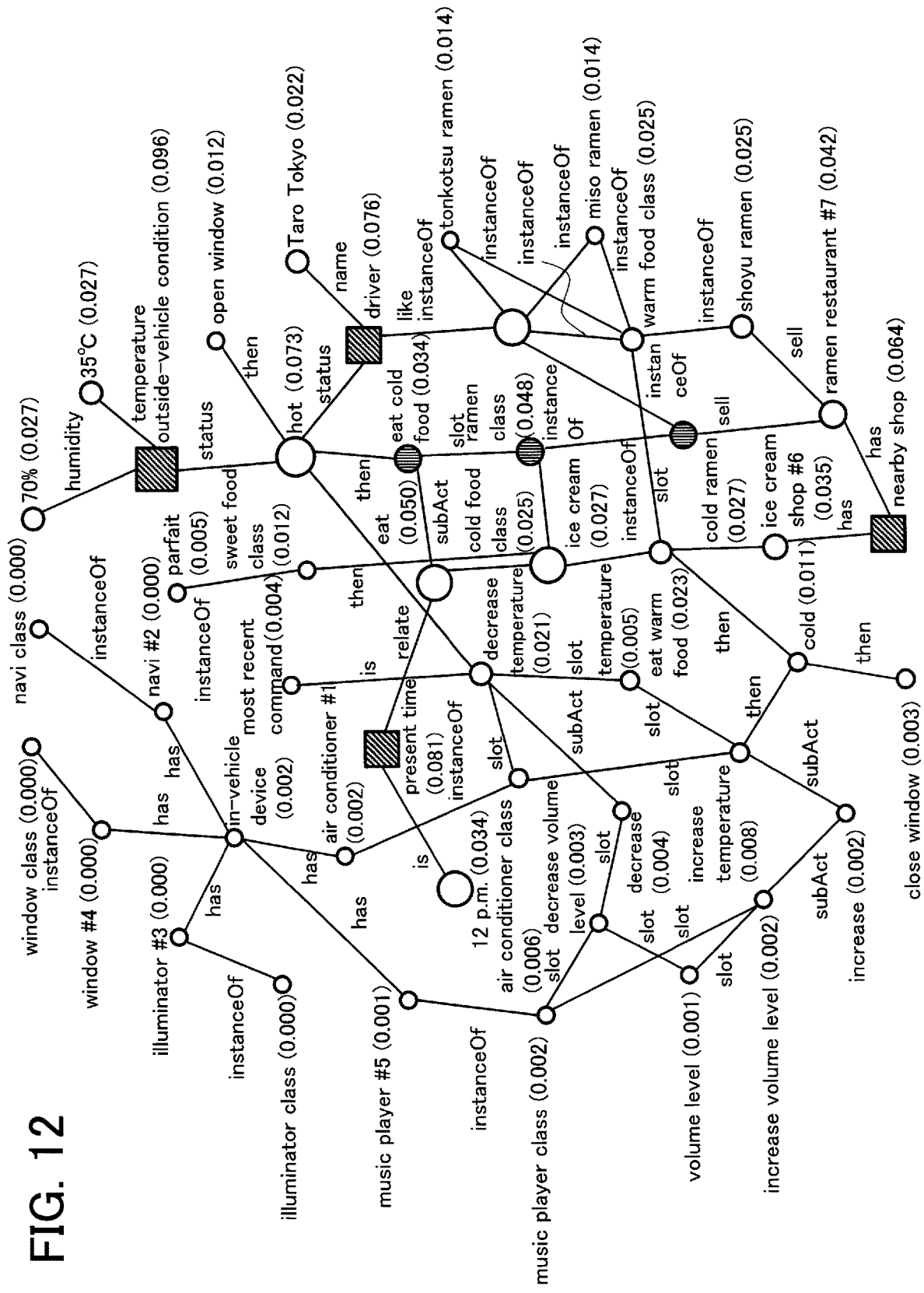
FIG. 12 is a diagram showing an example of an integrated graph (integrated graph corresponding to FIG. 11) including importance levels of nodes searched by the graph search unit of the inference device according to the first embodiment and the result of the search.

FIG. 12 is a diagram showing an example of an integrated graph (integrated graph corresponding to FIG. 11) including the importance levels of nodes searched by the graph search unit 16 of the inference device 10 according to the first embodiment and the result of the search. In FIG. 12, each parenthesized numerical value represents the importance level. Hatched quadrangles represent the observation nodes, and hatched circles represent nodes at high importance levels.

In this example, (slotValue: 'cold ramen', slotClass: 'cold food class', action: 'eat cold food')

is obtained at the top level. Consequently, information to be used by an in-vehicle agent to recommend the user "Would you like to eat cold ramen?" is obtained.

In the example of FIG. 11,

{'slotClass': 'cold food class', 'action': 'eat cold food', 'slotValue': 'cold ramen'} is obtained as the top level search result. That is because the top level search result can be acquired by use of "The driver likes ramen, that is, (driver, like, ramen class).", "There are a ramen restaurant Ra and an ice cream shop Ic as nearby shops.", "The present time is 12 p.m. and that relates to the action of eating." and "Since the in-vehicle air temperature is 35° C., the condition is hot. Therefore, a human eats cold food or decreases a temperature."

by performing a multistage inference by tracing the integrated graph by means of the random walk. Further, that is because the importance level (i.e., the probability of becoming the conclusion of the inference) of the node "eat cold food" or "cold ramen" has increased.

(1-2-8) Step S107: Outputting of Information

Finally, the information output unit 17 outputs information to the user interface 51 such as a display or a speaker in an appropriate form by using the output of the graph search unit 16. In the dialog examples D1 and D2 in Table 1, for example, the information output unit 17 outputs a speech like "There is a restaurant serving cold ramen near here." by means of speech synthesis.

(1-2-9) Example of Operation for Understanding User's Intention

The inference device 10 according to the first embodiment can be used also for a task for understanding the user's intention. For example, let us consider a task in which the inference device 10 receives a simple command "decrease" from the user and understands the intention of the command. In this case, since the knowledge base 11a includes two commands "decrease volume level" and "decrease temperature", the inference device 10 lists these two items as candidates for the intention of the command from the user. However, by using the inference device 10 according to the first embodiment, one candidate suitable for the situation can be selected appropriately based on the importance levels of nodes related to the user's command in the knowledge base 11a.

Figure 14:
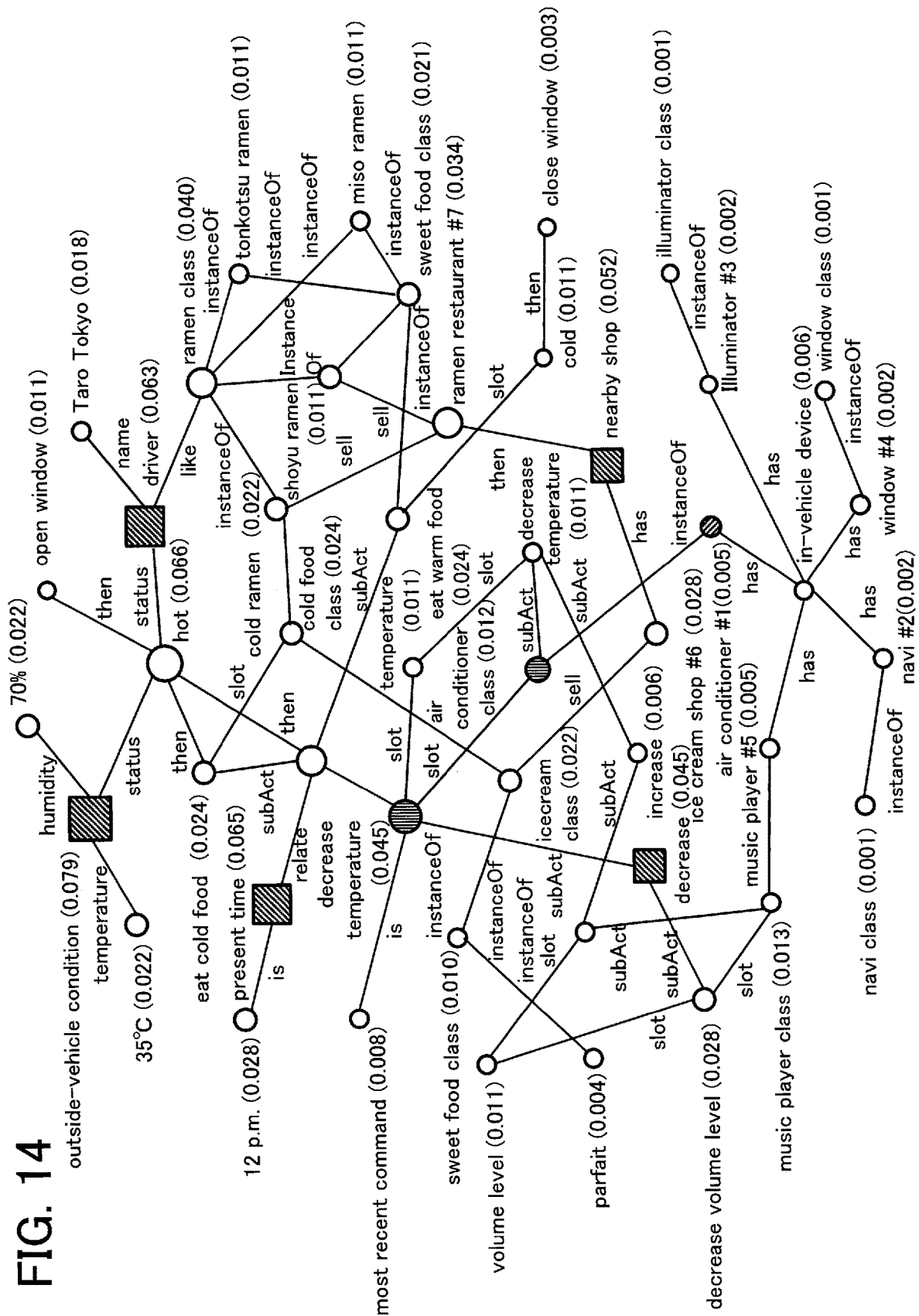
FIG. 14 is a diagram showing an example of an integrated graph (integrated graph corresponding to FIG. 13) including importance levels acquired by the operation of the inference device according to the first embodiment.

FIG. 13 is a diagram showing the result of calculating the importance levels by setting the ratios of "outside-vehicle condition", "nearby shop", "present time", "driver" and "decrease" in the observation vector (i.e., observation vector values) respectively at 0.2 in the integrated graph generated by the inference device 10 in tabular form (Table 6). FIG. 14 is a diagram showing an integrated graph as the result of the inference shown in Table 6.

Consequently, "decrease temperature" of "air conditioner #1" is selected as the first candidate. By the addition of "decrease" to the observation nodes, the importance level of "decrease temperature" increases. Accordingly, "decrease temperature of air conditioner" exceeds "eat cold ramen" in the importance level and reaches the top level.

(1-2-10) Example of Operation for Understanding User's Attention (Attention or Focus)

The inference device 10 according to the first embodiment is also capable of executing the inference by taking advantage of the user's attention (attention or focus). Let us consider a task of understanding the intention of the user's command when the "most recent command" inputted by the user is "increase volume level" and a command "decrease" is further received from the user. In this case, the possibility that the user's intention is "decrease volume level" is high since the user is most recently paying attention to a music player according to the context. The inference device 10 is capable of appropriately obtaining the user's intention by appropriately adjusting the ratios in the observation vector.

First, in the knowledge base 11a, a setting is made as follows:

('most recent command', 'is', 'increase volume level')

Subsequently, the observation vector values representing the ratios in the observation vector are set.

The observation vector value of each of "outside-vehicle condition", "nearby shop", "present time" and "driver" is set at 1, the observation vector value of "decrease" is set at 10, the observation vector value of "most recent command" is set at 3, and the other observation vector values are set at 0.

In this case, since "decrease" and "most recent command" are commands directly received from the user, their observation vector values, i.e., weights, are increased.

Figure 16:
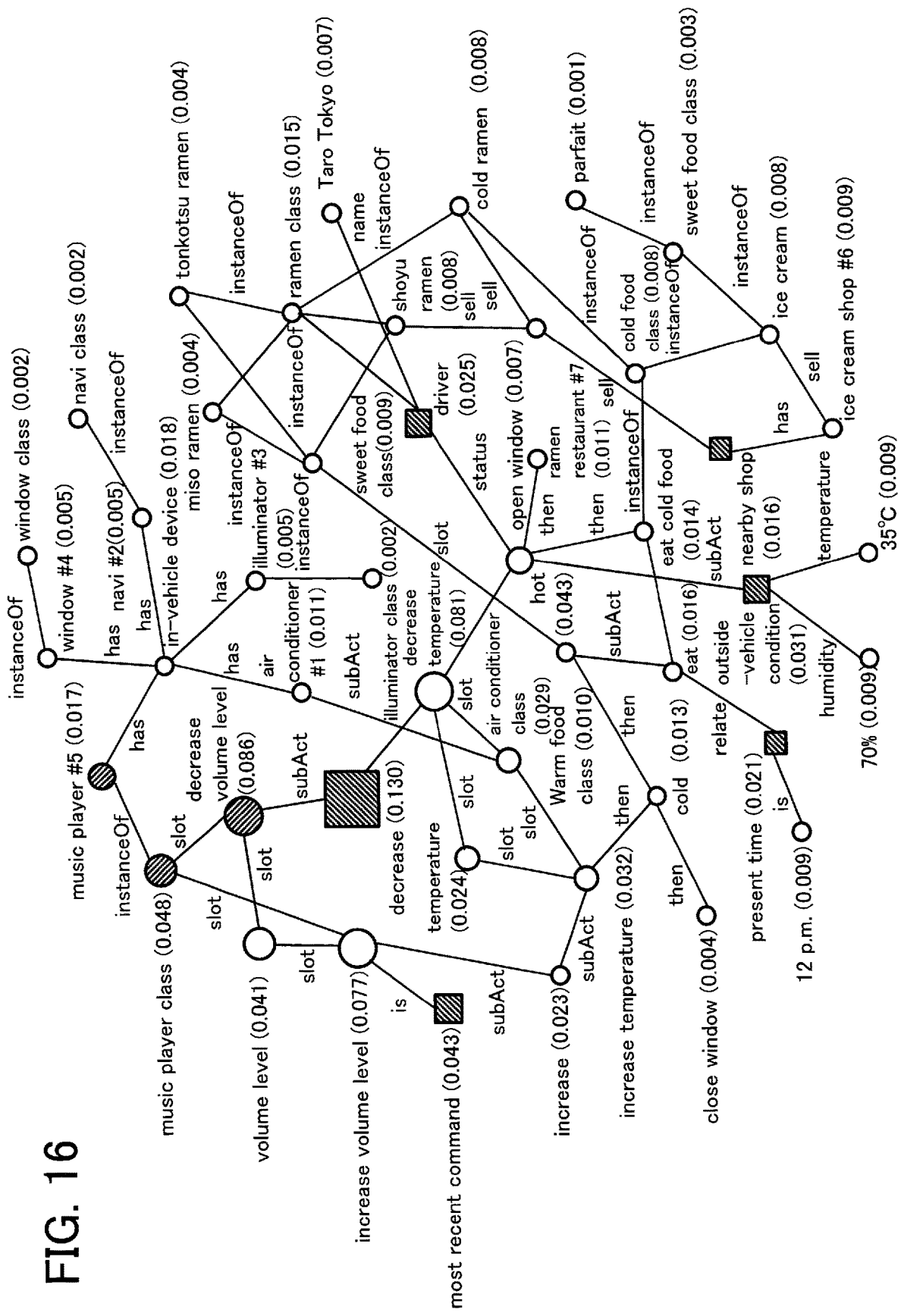
FIG. 16 is a diagram showing an example of an integrated graph (integrated graph corresponding to FIG. 15) including importance levels acquired by the operation of the inference device according to the first embodiment.

FIG. 15 is a diagram showing an example obtained by calculating the importance levels of nodes by using such settings in tabular form (Table 7). FIG. 16 is a diagram showing an integrated graph indicating the result of Table 7.

As shown in FIG. 15, "music player #5" and "decrease volume level" are extracted as the top level search result. This is because the importance levels of "music player #5" and "decrease volume level" have been increased by the inference using the fact that "decrease" corresponds to "decrease volume level" or "decrease temperature" and a music player has been operated according to the most recent command "increase volume level".

(1-3) Effect

As described above, with the inference device 10 and the inference method according to the first embodiment, the following advantages are obtained. First, the inference device 10 is capable of generating integrated information by dynamically combining items of information respectively belonging to multiple domains different from each other. By combining graphs in different domains, such as information on temperature, human's action, device and navigation, according to the forward chaining rule, an integrated graph can be generated and the integrated graph can be used for inference.

Further, the inference device 10 is capable of executing an inference without needing a great amount of learning data. Namely, the importance levels of nodes can be calculated without needing a great amount of learning data.

Furthermore, since the inference device 10 is capable of visualizing the inference process, when designing and proposing the contents of an inference, it is possible to let the user manually design values in the generation of the knowledge base 11a, the inference rules and the observation nodes. Moreover, it is possible to change the contents of the response by appropriately switching the applied rule set or the observation nodes depending on the status of the system. In addition, the inference result can be visualized by means of the integrated graph display as shown in FIG. 12, FIG. 14 and FIG. 16.

(1-4) Application to Other Fields

While an example in which artificial intelligence performs speech dialog with a driver in the middle of driving a vehicle was described in the above description, the inference device 10 is effective not only for vehicles and speech dialog but also for user interfaces, program planning and action prediction in environments in which data of various formats/time axes, such as data regarding a vehicle, a house, a factory, wide-area security and so forth, exist and change dynamically.

For example, by using a monitoring camera or a sensor installed in a house or a camera mounted on a household electric appliance such as an air conditioner or a refrigerator, it is also possible to make artificial intelligence expect a resident's next action and thereby automatically record a TV program, boil water, point out that a resident leaving home is forgetting to take an umbrella, and so forth.

(2) Second Embodiment (2-1) Configuration

In the inference device 10 and the inference method according to the first embodiment, information acquired from the outside, information detected by a sensor, or the like is set as an "observation node" as an important node that serves as the starting point of an inference, the observation vector is obtained from the observation nodes, and the inference result is calculated based on the obtained observation vector. In contrast, in an inference device and an inference method according to a second embodiment, an inference result adapted to each user is calculated by updating the observation vector based on history records of the user's operations and calculating the importance level vector based on the updated observation vector.

Figure 17:
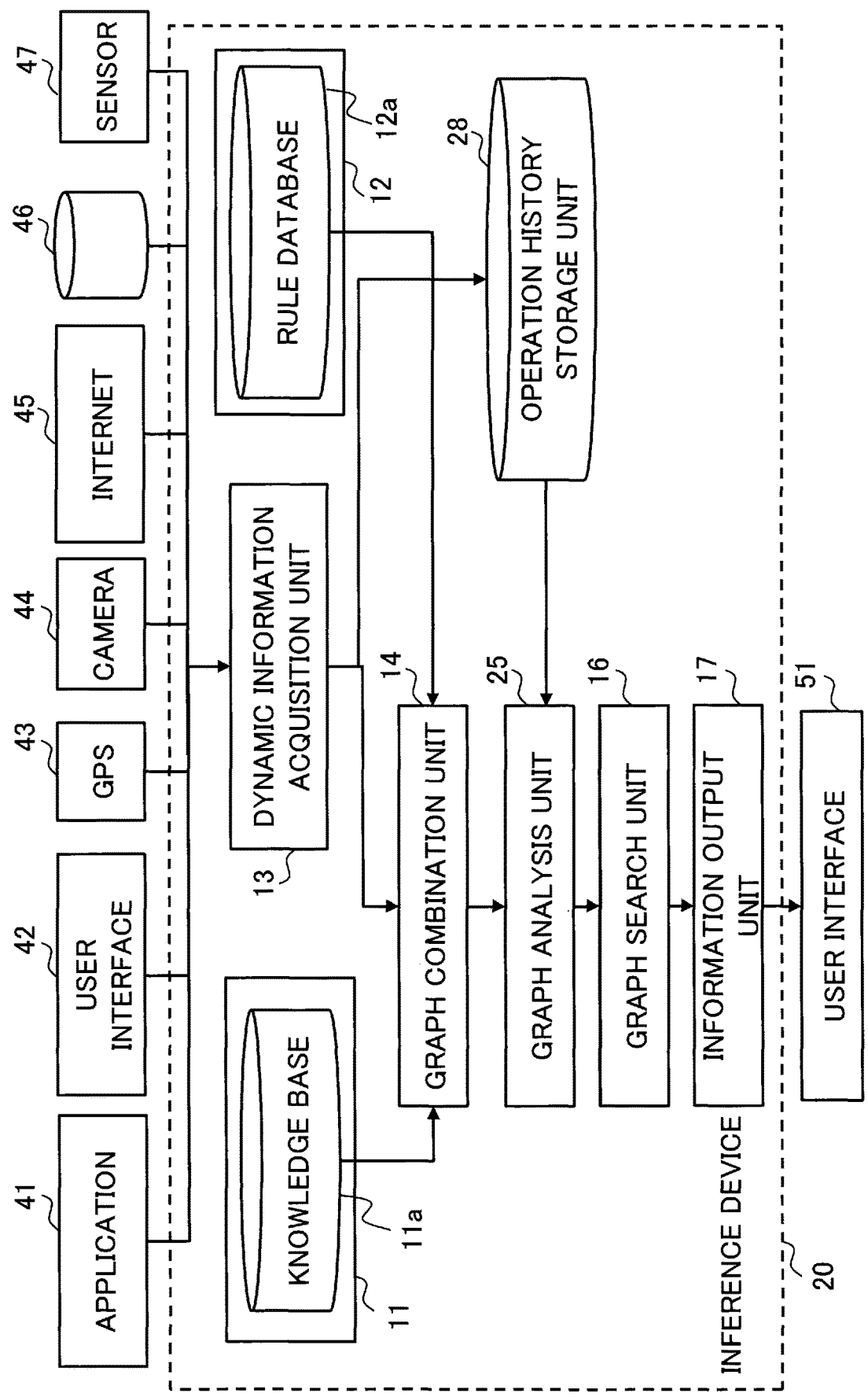
FIG. 17 is a functional block diagram schematically showing a configuration of an inference device according to a second embodiment of the present invention.

FIG. 17 is a functional block diagram schematically showing a configuration of an inference device 20 according to the second embodiment. In FIG. 17, each component identical or corresponding to a component shown in FIG. 1 is assigned the same reference character as that shown in FIG. 1. The inference device 20 according to the second embodiment differs from the inference device 10 according to the first embodiment in including an operation history storage unit 28 and in that a graph analysis unit 25 performs processing based on the history records of the user's operations.

(2-2) Operation

The inference device 20 executes the inference repeatedly. The first inference and the second and subsequent inferences will be described below.

(First Inference)

First, in step S201, the importance levels are calculated. Similarly to the operation in the first embodiment, the graph analysis unit 25 calculates the importance levels of the nodes and the information output unit 17 presents the user with the result of the calculation of the importance levels. Incidentally, when the importance level vector $x_v$ is calculated in the first inference, a predetermined initial vector is used as the observation vector. In the second embodiment, the observation vector can be set according to the same method as in the first embodiment. Alternatively, values set manually or values uniform throughout all the elements may be set as the observation vector.

Figures 18A, 18B:
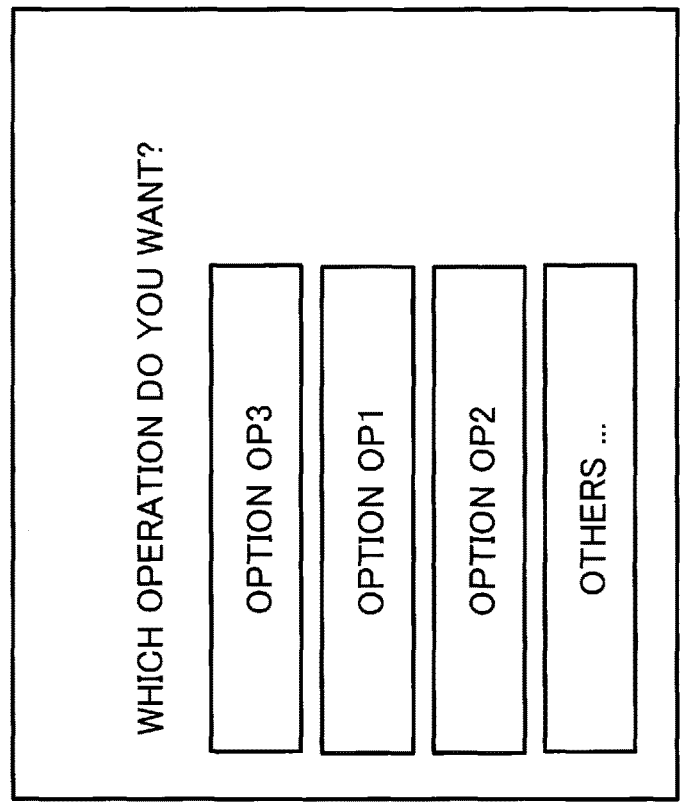
FIGS. 18(a) and 18(b) are diagrams showing examples of information outputted by an information output unit of the inference device according to the second embodiment

In the next step S202, options are presented. The information output unit 17 presents the options by using the importance level vector. For example, as shown in FIG. 18(a), the information output unit 17 displays top three inference results on the display of the application. On the display, three option buttons of an option OP1, an option OP2 and an option OP3 are serially displayed from the top in descending order of the importance level of the inference. Also displayed is an "OTHERS" button, with which other options of lower importance levels can be displayed. A display method can be freely selected by the user.

The option OP1, the option OP2 and the option OP3 respectively correspond to a node OP1, a node OP2 and a node OP3.

In the next step S203, an operation history record is stored. The operation history storage unit 28 successively stores history records of the user's operations acquired via the dynamic information acquisition unit 13. The data stored by the operation history storage unit 28 can be information regarding a node name selected by the user. Alternatively, the data stored by the operation history storage unit 28 can be information indicating an order or relative importance levels of a node selected by the user and other nodes.

Here, the information indicating relative importance levels of nodes will be explained. For example, let us discuss a case where the user has selected the option OP3 in the example shown in FIG. 18(a). In this case, it can be judged that the importance level of the option OP3 is higher than those of the option OP1 and the option OP2 for this user. Accordingly, the operation history storage unit 28 stores information including information "importance level of option OP3 (node OP3)>importance level of option OP1 (node OP1)" and information "importance level of option OP3 (node OP3)>importance level of option OP2 (node OP2)" as the operation history record.

In the next step S204, the observation vector is updated. The graph analysis unit 25 obtains the updated observation vector v[n] by using the operation history records. The method of updating the observation vector v[n] will be described later. Here, v[n] represents the observation vector calculated in the n-th inference (n: positive integer).

(Second and Subsequent Inferences)

First, in the step S201, the importance levels are calculated. In the n-th inference, the graph analysis unit 25 uses the previously obtained first to (n−1)-th observation vectors v[1] to v[n−1], i.e., v[1] to v[n−1] and thereby obtains the importance level vector $x_v$ [n], i.e., $x_v$[n] of the nodes included in the integrated graph, where the vector $x_v$ [n] represents the importance level vector calculated in the n-th inference.

The graph analysis unit 25 obtains the importance level vector according to the expression (1) or the expression (3). In this case, the graph analysis unit 25 may use the observation vector v[n−1] alone. Alternatively, the graph analysis unit 25 may use the linear sum of the observation vectors v[1] to v[n−1] as the observation vector. Namely, let β[i] (i: positive integer) represent a predetermined constant, the graph analysis unit 25 may use an observation vector $\bar{v}$ obtained from the following expression (4) in the n-th inference:

$$\bar{v} = \Sigma_{i=1}^{n-1} \beta[i] v[i] \qquad (4).$$

Since information on the operation history is held in the observation vector as will be explained later, the graph analysis unit 25 is capable of calculating the importance level vector $x_v$[n] that satisfies the condition "importance level of option OP3 (node OP3)>importance level of option OP1 (node OP1)" and the condition "importance level of option OP3 (node OP3)>importance level of option OP2 (node OP2)".

In the next step S202, options are presented. The information output unit 17 presents the options to the user again by using the importance level vector. In this case, options incorporating the previous selection result of the user are displayed on the display. For example, as shown in FIG. 18(b), the option OP3 selected by the user the previous time is displayed at the top position and subsequently the option OP1 and the option OP2 are displayed in this order.

Subsequently, the steps S203 and S204 are executed. These steps are the same processes as those in the first inference.

The inference device 20 repeats the processing of the steps S201 to S204, and each time the user's operation history record is acquired, calculates the importance levels and updates the observation vector, and returns an inference result adapted to the user each time. In the following, two concrete examples of the method of updating the observation vector v will be described.

(Example (U1) of Method of Updating Observation Vector v)

FIG. 19 is a diagram showing Table 8 that is used for explaining a method by which the graph analysis unit 25 of the inference device 20 according to the second embodiment obtains the observation vector v[n]. By using FIG. 19, the method for the graph analysis unit 25 for obtaining the observation vector v[n] will be described below. In this example, the data that can be acquired dynamically is changed each time the inference is executed, for example.

In the first inference, the targeted graph includes triplets of (vanilla ice cream, instanceOf, ice cream class) and (shoyu ramen, instanceOf, ramen class).

In the second inference, the targeted graph includes triplets of (strawberry ice cream, instanceOf, ice cream class) and (tonkotsu ramen, instanceOf, ramen class).

First, before starting the inference, the ratios of the values in the initial observation vector v are set by setting the ratio of the ice cream class in the observation vector at 1, setting the ratio of the ramen class at 1, and setting other ratios at 0 as shown in FIG. 19. Incidentally, the values in the observation vector v are properly normalized so that the sum total of the elements of the observation vector v equals 1.

Next, a description will be given of a case where the graph analysis unit 25 in the first inference has calculated the importance levels, the information output unit 17 has presented the user with "shoyu ramen" and "vanilla ice cream" as the options, and the user has selected "shoyu ramen". In this case, the graph analysis unit 25 increments the ratios of the selected "shoyu ramen" and its abstract superordinate concept "ramen class" in the observation vector v by 1, for example. Consequently, at the end of the first inference, the ratio of the ice cream class in the observation vector v is 1, the ratio of the ramen class is 2, the ratio of shoyu ramen is 1, and the other ratios are 0.

To sum up, at this point, the greatest weight is assigned to the observation node of the ramen class, and in the next and subsequent inferences, the importance levels of the ramen class and nodes as instances of the ramen class become high. Namely, the observation vector v holds information "user likes ramen in general (ramen class)".

In the second inference, when the graph analysis unit 25 calculates the importance levels, the greatest weight is assigned to the observation node of the ramen class even though there is no node of "shoyu ramen" selected the previous time, and thus great weights are assigned to nodes related to ramen as below, for example, in the importance level ratios calculated by the graph analysis unit 25. For example, the ratio of the ice cream class in the importance level vector is 2, the ratio of the ramen class is 3, the ratio of tonkotsu ramen is 2, the ratio of strawberry ice cream is 1, and the other ratios are 0.

By using the information on the importance levels, the information output unit 17 presents information in the order of tonkotsu ramen and strawberry ice cream. Here, let us discuss a case where the user selects "tonkotsu ramen". In this case, the graph analysis unit 25 increments the ratios of the selected "tonkotsu ramen" and its superordinate concept "ramen class" in the observation vector v respectively by 1, for example. Consequently, at the end of the second inference, the ratios in the observation vector v are as follows: The ratio of the ice cream class is 1, the ratio of the ramen class is 3, the ratio of shoyu ramen is 1, the ratio of tonkotsu ramen is 1, and the other ratios are 0.

Consequently, the greatest weight is assigned to the ramen class. This means that the observation vector v holds the information "user likes ramen in general (ramen class)" with higher certainty.

As above, the inference device 20 is capable of holding information on the user's taste or habit in the observation vector by updating the observation vector by using the selection result of the user. Therefore, it becomes possible to calculate an inference result according to the user's taste or habit in the second and subsequent inferences.

Especially, by repeating the update of the observation vector based on the selection result of the user as shown in the above example, the weight in the observation vector increases not on concrete instances such as shoyu ramen or tonkotsu ramen but on superordinate concepts (upper ontology) such as the ramen class or the ice cream class. Accordingly, information on the user's taste or habit can be held not as a concrete event but as a superordinate concept. Consequently, even when the acquired information changes dynamically and nodes of new events are added, nodes of such superordinate concepts constantly exist in the graph and that enables the inference adapted to the user.

On the other hand, cases such as a case where the user likes a particular event can also be represented by the update of the observation vector. For example, when the user always selects "shoyu ramen" only, only the weight of "shoyu ramen" in the observation vector increases. Accordingly, the importance level of the node of "shoyu ramen" as a concrete event remains constantly high.

(Example (U2) of Method of Updating Observation Vector v)

It is also possible for the graph analysis unit 25 to update the observation vector by minimizing a cost function CF2 which will be described later. An example of the operation will be described below. The importance level vector is represented as $x_v$ and the importance level of the i-th node is represented as $x_v(i)$. When there are the options OP1, OP2 and OP3 as shown in FIGS. 18(a) and 18(b), a node number of each option is represented as i, j, k. For example, $x_v(i)$ represents the importance level of the option OP1.

It is assumed here that results "$x_v(i) > x_v(j)$" and "$x_v(j) > x_v(k)$" have been obtained in the first inference. In this case, on the display, the options OP1, OP2 and OP3 are displayed from the top in descending order of the importance level as shown in FIG. 18(a).

Here, a description will be given of a case where the user has selected the option OP3 in the example of FIG. 18(a), for example. In this case, it can be judged that the importance level of the option OP3 is higher than those of the option OP1 and the option OP2 for this user, and thus the operation history storage unit stores node information indicating the condition "importance level of option OP3 > importance level of option OP1" and the condition "importance level of option OP3 > importance level of option OP2" as an operation history record Hist.

Subsequently, based on the information in the operation history record Hist, the graph analysis unit 25 obtains an observation vector v that satisfies the condition "importance level of option OP3 > importance level of option OP1" and the condition "importance level of option OP3 > importance level of option OP2", namely, "$x_v(k) > x_v(i)$" and "$x_v(k) > x_v(j)$".

Specifically, the graph analysis unit 25 simultaneously obtains a new observation vector v and an importance level vector $x_v$ that minimize the cost CF2 calculated by the following expression (5):

$$CF2 = \left\| v - \frac{1}{1-\alpha}(E - \alpha P)x_v \right\|^2 + H_L(x_v(i) - x_v(k)) + H_L(x_v(j) - x_v(k)). \quad (5)$$

The first term on the right side of the expression (5) is the same as the right side of the expression (3). The second tam and the third term on the right side of the expression (5) are terms for guaranteeing "$x_v(k) > x_v(i)$" and "$x_v(k) > x_v(j)$". Further, $H_L(U)$ is an arbitrary function that equals 0 when $u < 0$ and takes on a positive value when $u \geq 0$, which is represented also as a function $H_L(u)$.

For example, the function HL(u) can be a hinge loss function like the one shown in the following expression (6):

$$H\_L(u) = \max(0, u) \quad (6).$$

In the expression (6), the function $H_L(u)$ is a function that equals 0 when $u < 0$ and linearly increases when $u \geq 0$.

Further, the elements of the vector v and the vector x are nonnegative values, the sum total of the elements of the vector v is 1, and the sum total of the elements of the vector x is 1. Since the observation vector v obtained as above satisfies the condition "$x_v(k) > x_v(i)$" and the condition "$x_v(k) > x_v(j)$", it can be interpreted that the observation vector v holds information on the user selection result.

(2-3) Effect

As described above, with the inference device 20 and the inference method according to the second embodiment, adaptive user interface responses such as speech dialog adapted to the user's taste can be realized by storing the operation history record of the user, updating the observation vector based on the operation history record, and calculating the next inference result based on the observation vector.

Further, in the update of the observation vector, the user's taste or habit can be learned on the level of abstracted concepts by weighting not only individual events but also superordinate concepts (upper ontology).

Except for the above-described features, the second embodiment is the same as the first embodiment.

(3) Third Embodiment (3-1) Configuration

When the inference device 10 and the inference method according to the first embodiment are used, there are cases where the user wants to know the reason for the result of the inference, that is, the reason why the recommendation was made. For example, in the dialog example shown in Table 1, when the artificial intelligence agent including the inference device 10 uttered "There is a restaurant serving cold ramen near here.", the user can ask back the reason for the recommendation, like "Why did you recommend cold ramen?". In this case, the artificial intelligence agent is required to explain to the user the reason why the recommendation is "cold ramen". In a third embodiment, a description will be given of an inference device 30 having a function of explaining the reason for the recommendation to the user and an inference method for executing such a function.

FIG. 20 is a functional block diagram schematically showing a configuration of the inference device 30 according to the third embodiment. In FIG. 20, each component identical or corresponding to a component shown in FIG. 1 is assigned the same reference character as that shown in FIG. 1. The inference device 30 according to the third embodiment differs from the inference device 10 according to the first embodiment in including a graph path analysis unit 38 and in processing performed by a graph analysis unit 35 and a graph search unit 36.

(3-2) Operation

In the first step S301, similarly to the first embodiment, the graph analysis unit 35 obtains the importance levels of the nodes in the acquired integrated graph and presents the user with a plurality of options according to the importance levels of the nodes. For example, let us discuss a case where the information output unit 17 has set "outside-vehicle condition" as the observation node and recommended the node of "cold ramen" as in the dialog example of Table 1.

In the next step S302, the graph path analysis unit 38 acquires the integrated graph and sets an inference start node and an inference end node among the nodes in the integrated graph. The graph path analysis unit 38 calculates a path that maximizes the sum total of the importance levels of nodes in the path among paths connecting the inference start node and the inference end node. Incidentally, the calculated path is a path that passes through the same node only once.

Figure 21:
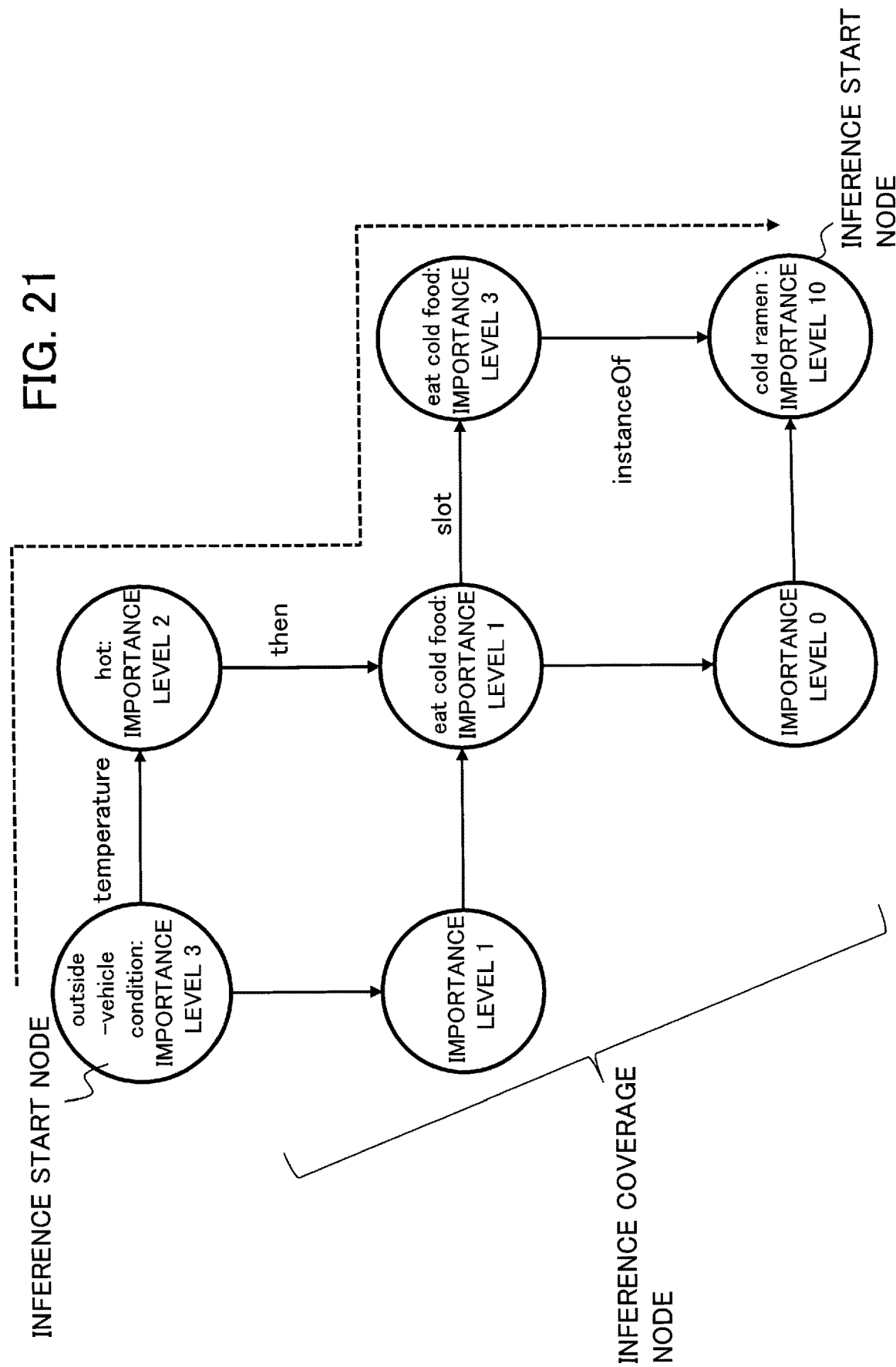
FIG. 21 is a diagram showing an example of the operation of a graph path analysis unit of the inference device according to the third embodiment.

FIG. 21 is a diagram showing an example of the operation of the graph path analysis unit 38 of the inference device 30 according to the third embodiment. In FIG. 21, "outside-vehicle condition" as one of the observation nodes is set as the inference start node, for example. As the inference end node, "cold ramen" as the recommendation is set.

Subsequently, the graph path analysis unit 38 calculates a path that maximizes the sum total of the importance levels of nodes (the path indicated by a dot line arrow in FIG. 21) among the paths in the graph from "outside-vehicle condition" as the inference start node to "cold ramen" as the inference end node.

Specifically, the graph path analysis unit 38 acquires a path that serially connects the nodes of "outside-vehicle condition", "hot", "eat cold food", "cold food" and "cold ramen". This path is the path that maximizes the sum total of the importance levels (value: 19) among the paths connecting the inference start node and the inference end node. In this step, for enumerating the paths, a graph enumeration method employing ZDD (Zero-suppressed Decision Diagram) described in Non-patent Reference 4 may be used, for example.

Non-patent Reference 4: Jun Kawahara and three others, "Frontier-based Search for Enumerating All Constrained Subgraphs with Compressed Representation", TCS Technical Report, Division of Computer Science, Report Series A, Sep. 30, 2014

In the next step S303, the information output unit 17 outputs an inference reason by using information on the optimum path. For example, based on the path information on the integrated graph having nodes arranged in the order of "outside-vehicle condition", "hot", "eat cold food", "cold food" and "cold ramen noodle", the information output unit 17 generates a sentence "That is because I inferred that the outside-vehicle condition is hot and you want to eat cold food, then that's cold ramen.".

By the above-described processing, the inference device 30 is capable of outputting an answer "That is because I inferred that the outside-vehicle condition is hot and you want to eat cold food, then that's cold ramen." to the user's question "Why did you recommend cold ramen?".

Further, when a plurality of inference start nodes exist, a plurality of optimum paths and inference reasons may be calculated. For example, when four nodes "outside-vehicle condition", "nearby shop", "most recent command" and "driver" are the observation nodes, it is possible to set these nodes as the inference start nodes and calculate four optimum paths and four inference reasons.

(3-3) First Modification

FIG. 22(a) is a diagram showing another example of the operation of the graph path analysis unit of the inference device according to a first modification of the third embodiment.

In the example of FIG. 21, the graph path analysis unit 38 obtains the path maximizing the sum total of the importance levels among the paths connecting the inference start node and the inference end node, determines the path as the optimum path, and generates the inference reason based on the optimum path. However, the operation of the graph path analysis unit 38 is not limited to that shown in FIG. 21. The graph path analysis unit 38 may also be configured to determine the optimum path based on the number of nodes in each path connecting the inference start node and the inference end node, namely, a node total number, and generate the inference reason based on the optimum path. For example, the graph path analysis unit 38 may obtain a path that minimizes the node total number among the paths connecting the inference start node and the inference end node and determine the path as the optimum path. When there is a plurality of paths minimizing the node total number, the graph path analysis unit 38 may obtain a path that maximizes the sum total of the importance levels of the nodes covered by the path among the plurality of paths and determine the path as the optimum path.

In FIG. 22(a), the paths connecting the inference start node S and the inference end node G are the following three paths:

(path P11): path connecting nodes S, N1, N2, N3 and G, (path P12): path connecting nodes S, N4 and G, and (path P13): path connecting nodes S, N5 and G.

In the path P11, the number of the covered nodes is 5 and the sum total of the importance levels of the covered nodes is 14.

In the path P12, the number of the covered nodes is 3 and the sum total of the importance levels of the covered nodes is 7.

In the path P13, the number of the covered nodes is 3 and the sum total of the importance levels of the covered nodes is 3.

In this case, the graph path analysis unit 38 obtains the paths P12 and P13 minimizing the number of the covered nodes among the paths P11, P12 and P13 connecting the inference start node S and the inference end node G, and when there is a plurality of minimizing paths, employs the path P12 maximizing the sum total of the importance levels among these paths as the optimum path and generates the inference reason by using the optimum path. In this example, the path P12 corresponds to the optimum path. Generating the inference reason by using the path P12 has an advantage in that a simplified inference reason can be generated.

In contrast, among the paths P11, P12 and P13 connecting the inference start node S and the inference end node G, the path maximizing the sum total of the importance levels is the path P11. If the inference reason is generated by using the path P11, there is a case where the sentence becomes long and understanding the sentence becomes difficult for a human. With the first modification shown in FIG. 22(a), an appropriate inference reason can be generated in such a case.

(3-4) Second Modification

Figure 22B:
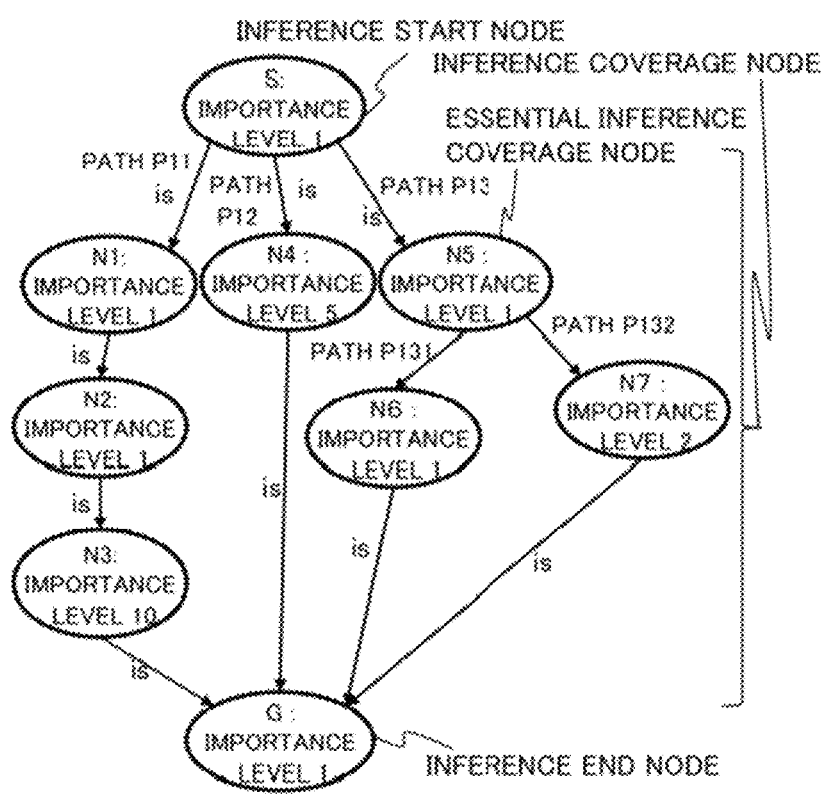

FIG. 22(b) is a diagram showing another example of the operation of the graph path analysis unit of the inference device according to a second modification of the third embodiment.

There are cases where a node that must be necessarily used for generating the inference reason has previously become clear. The graph path analysis unit 38 may generate the inference reason by designating a node that the optimum path has been determined to cover, that is, a node that must be necessarily used for generating the inference reason, as an essential inference coverage node.

In the example shown in FIG. 22(b), the graph path analysis unit 38 designates the node S as the inference start node, the node G as the inference end node, and the node N5 as the essential inference coverage node. The graph path analysis unit 38 calculates a path in the graph that connects the inference start node S and the inference end node G and passes through the essential inference coverage node N5 as the optimum path. In the example of FIG. 22(b), the path P13 passing through the essential inference coverage node N5, that is, the path P131 or P132, corresponds to the optimum path.

Since there is a plurality of paths passing through the essential inference coverage node N5 in the example of FIG. 22(b), the graph path analysis unit 38 uses one of the plurality of paths, that is, the path P131 or the path P132, for generating the inference reason. In this case, the graph path analysis unit 38 can use the method of generating the inference reason described with reference to FIG. 22(a), for example.

In FIG. 22(b), the paths connecting the inference start node S and the inference end node G and passing through the essential inference coverage node N5 are the following two paths:

(path P131): path connecting nodes S, N5, N6 and G, and (path P132): path connecting nodes S, N5, N7 and G.

In the path P131, the number of the covered nodes is 4 and the sum total of the importance levels of the covered nodes is 4.

In the path P132, the number of the covered nodes is 4 and the sum total of the importance levels of the covered nodes is 5.

In this case, the graph path analysis unit 38 obtains the paths P131 and P132 minimizing the number of the covered nodes among the paths P131 and P132 connecting the inference start node S and the inference end node G, and when there is a plurality of minimizing paths, employs the path P132 maximizing the sum total of the importance levels among these paths as the optimum path and generates the inference reason by using the optimum path. In this example, the path P132 corresponds to the optimum path. Generating the inference reason by using the path P132 has an advantage in that a simplified inference reason can be generated.

(3-5) Third Modification

The graph path analysis unit 38 may generate the inference reason by using a rule node and include information on an applied inference rule in the inference reason.

Figure 23A:
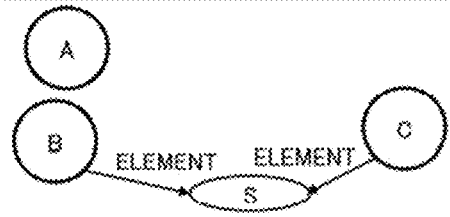
Figure 23B:
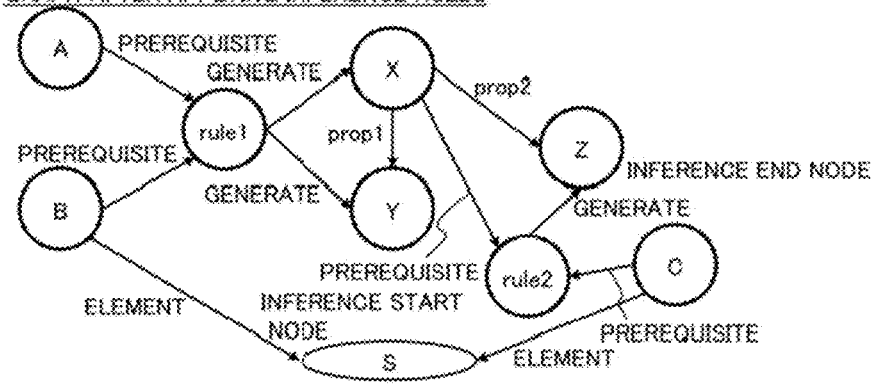

FIGS. 23(a) to 23(c) are diagrams showing still another example of the operation of the graph path analysis unit 38 of the inference device according to a third modification of the third embodiment. FIG. 23(a) shows a graph before applying inference rules, and in this graph, only nodes A, B, C and S exist. Here, the node S is assumed to be the observation node.

In the next step S301a, the graph path analysis unit 38 generates the integrated graph by applying inference rules.

In this case, the graph combination unit 14 adds rule nodes indicating information on a prerequisite of each inference rule and nodes generated by the inference rules, to the integrated graph. FIG. 23(*b*) shows an example of the integrated graph obtained by the graph combination unit 14 by applying the following two inference rules rule1 and rule2:

rule1: If node A and node B exist, triplet (X, prop1, Y) holds.
rule2: If node C and node X exist, triplet (X, prop2, Z) holds.

Here, "prop1" and "prop2" mean property1 and property2, i.e., property 1 and property 2. While "prop1" and "prop2" are "like", for example, "prop1" and "prop2" can also be different properties.

When "prop1" and "prop2" are "like":
rule1: If node A and node B exist, triplet (X, like, Y) holds.
Namely, "What X likes is Y." holds.
rule2: If node C and node X exist, triplet (X, like, Z) holds.
Namely, "What X likes is Z." holds.

As shown in FIG. 23(*b*), the graph combination unit 14 generates rule nodes rule1 and rule2 and adds them to the integrated graph, for example. Here, for example, the triplet (A, prerequisite, rule1) represents that "A is a prerequisite reason for rule1.". Further, the triplet (rule1, generate, X) represents that "Node X was newly generated by rule1.".

In the next step S302*a*, the graph path analysis unit 38 designates the rule nodes as the essential inference coverage nodes and obtains the optimum path.

For example, in the integrated graph of FIG. 23(*b*), to the user's question "Why was Z generated?", the graph path analysis unit 38 is capable of generating the reason as follows:

In the integrated graph of FIG. 23(*c*), the graph path analysis unit 38 sets S being the observation node as the inference start node, sets rule1 and rule2 as the essential inference coverage nodes, sets Z as the inference end node, and calculates the path that maximizes the sum total of the importance levels. Incidentally, in the case where rule1 and rule2 are designated as the essential inference coverage nodes, the processing when there is a plurality of paths as paths from the inference start node S to the inference end node Z via an essential inference coverage node can be performed by employing the processing in the case of the second modification described earlier with reference to FIG. 22(*b*).

Consequently, the graph path analysis unit 38 calculates a path connecting the nodes S, B, rule1, Y, X, rule2 and Z, for example. This path is indicated by the arrow with the dotted line 80 in FIG. 23(*c*).

In the next step S303, the information output unit 17 outputs the inference reason by using the information on the optimum path. For example, by using the information on the nodes in the path, inference reasons are successively generated as described below. As above, "application of which rule generated Z" can be calculated.

In the example of FIG. 23(*c*), the generated inference reasons are the following reasons:
Elements of inference start node S include node B.
Node B is prerequisite for node rule1.
Node rule1 generated node Y.
Node Y is prop1 of node X.
Node X is prerequisite for node rule2.
Node rule2 generated inference end node Z.

(3-6) Effect

As described above, with the inference device 30 and the inference method according to the third embodiment, the answer to the user's question "Why did you think so?" to the artificial intelligence can be given to the user while presenting the reason in a visually understandable and logical manner.

Except for the above-described features, the third embodiment is the same as the first or second embodiment. Components of the first to third embodiments can be appropriately combined with each other.

DESCRIPTION OF REFERENCE CHARACTERS

10, 20, 30: inference device, 11: knowledge base unit, 11*a*: knowledge base, 12: rule database unit, 12*a*: rule database, 13: dynamic information acquisition unit, 14: graph combination unit (information combination unit), 15, 25, 35: graph analysis unit (information analysis unit), 16, 36: graph search unit (information search unit), 17: information output unit, 28: operation history storage unit, 38: graph path analysis unit, 41: application, 42: user interface, 43: GPS, 44: camera, 45: Internet, 46: external database, 47: sensor, 51: user interface.

What is claimed is:
1. An inference device comprising:
processing circuitry to generate integrated information by combining items of information respectively belonging to domains different from each other included in dynamically changing external information via forward chaining by using knowledge information including information regarding a human's condition and information regarding a human's action and provided from a knowledge base and an inference rule provided from a rule database; and
an operation history storage that stores operation history records of a user, wherein
each of the items of information respectively belonging to domains different from each other is information that can be represented as a directed graph including a node and an edge,
the integrated information is an integrated graph generated by combining directed graphs that are the items of information respectively belonging to different domains,
the processing circuitry calculates an importance level of a node as a component of the integrated graph from a probability of arriving at the node in a stationary state reached by performing a random walk on the integrated graph or by using an algorithm of PageRank, and
the processing circuitry
sets a node that is a component of the directed graph and serves as a starting point of an inference according to the inference rule, as an observation node,
generates an observation vector in which a weight of the observation node is set at a value higher than or equal to 0 and weights of nodes other than the observation node are set at 0,
calculates the importance level based on the observation vector,
updates the observation vector based on the operation history records, and
calculates the importance level based on the updated observation vector.

2. The inference device according to claim 1, wherein
the processing circuitry has transformation patterns for transforming the directed graph, and
the transformation patterns include
a first transformation pattern in which the directed graph is used without transformation,
a second transformation pattern in which the directed graph is transformed into a non-directed graph, and
a third transformation pattern in which the directed graph is transformed into a reverse direction directed graph.

3. The inference device according to claim 1, wherein the processing circuitry converts the external information to information in a predetermined format.

4. An inference device comprising processing circuitry
to generate integrated information by combining items of information respectively belonging to domains different from each other included in dynamically changing external information via forward chaining by using knowledge information including information regarding a human's condition and information regarding a human's action and provided from a knowledge base and an inference rule provided from a rule database, wherein
each of the items of information respectively belonging to domains different from each other is information that can be represented as a directed graph including a node and an edge,
the integrated information is an integrated graph generated by combining directed graphs that are the items of information respectively belonging to different domains,
the processing circuitry sets an inference start node, an inference coverage node and an inference end node among the nodes in the integrated graph and calculates an optimum path among paths in the integrated graph connecting the inference start node and the inference end node,
the processing circuitry determines a path that maximizes a sum total of the importance levels of nodes in the path among the paths in the integrated graph connecting the inference start node and the inference end node as the optimum path,
the importance level of each node corresponds to an arrival probability of the node,
the processing circuitry designates a node that the optimum path has been determined to cover as an essential inference coverage node,
when there is only one path that covers the essential inference coverage node, the processing circuitry determines the one path as the optimum path,
when there is a plurality of paths that cover the essential inference coverage node and there is only one path that minimizes the number of nodes in the path among the plurality of paths, the processing circuitry determines the one path as the optimum path,
when there is a plurality of paths that cover the essential inference coverage node and there is a plurality of paths that minimize the number of nodes in the path among the plurality of paths, the processing circuitry determines a path that maximizes a sum total of the importance levels of the nodes among the plurality of paths minimizing the number of nodes in the path as the optimum path, and
a rule node indicating an inference rule and a node generated by applying the rule node are added to the integrated graph as the essential inference coverage nodes.

5. The inference device according to claim 4, wherein
when there is only one path that minimizes the number of nodes in the path among the paths in the integrated graph connecting the inference start node and the inference end node, the processing circuitry determines the one path as the optimum path, and
when there is a plurality of paths that minimize the number of nodes in the path among the paths in the integrated graph connecting the inference start node and the inference end node, the processing circuitry determines a path that maximizes a sum total of the importance levels of the nodes among the plurality of paths as the optimum path.

6. The inference device according to claim 4, wherein the processing circuitry
designates a node that the optimum path has been determined to cover as an essential inference coverage node, and
determines a path that covers the inference coverage node as the optimum path.

7. An inference method performed by an inference device, the method comprising:
generating integrated information by combining items of information respectively belonging to domains different from each other included in dynamically changing external information by means of forward chaining by using the knowledge information regarding a human's condition and information regarding a human's action and provided from a knowledge base and an inference rule provided from a rule database, wherein each of the items of information respectively belonging to domains different from each other is information that can be represented as a directed graph including a node and an edge, and the integrated information is an integrated graph generated by combining directed graphs that are the items of information respectively belonging to different domains;
setting an inference start node, an inference coverage node and an inference end node among the nodes in the integrated graph and calculating an optimum path among paths in the integrated graph connecting the inference start node and the inference end node; and
determining a path that maximizes a sum total of the importance levels of nodes in the path among the paths in the integrated graph connecting the inference start node and the inference end node as the optimum path, wherein the importance level of each node corresponds to an arrival probability of the node, wherein
the method further comprises
designating a node that the optimum path has been determined to cover as an essential inference coverage node,
when there is only one path that covers the essential inference coverage node, determining the one path as the optimum path,
when there is a plurality of paths that cover the essential inference coverage node and there is only one path that minimizes the number of nodes in the path among the plurality of paths, determining the one path as the optimum path, and
when there is a plurality of paths that cover the essential inference coverage node and there is a plurality of paths that minimize the number of nodes in the path among the plurality of paths, determining a path that maximizes a sum total of the importance levels of the nodes among the plurality of paths minimizing the number of nodes in the path as the optimum path, and a rule node indicating an inference rule and a node generated by applying the rule node are added to the integrated graph as the essential inference coverage nodes.

8. A non-transitory computer-readable storage medium storing an inference program that causes a computer to execute:

generating integrated information by combining items of information respectively belonging to domains different from each other included in dynamically changing external information by means of forward chaining by using the knowledge information including information regarding a human's condition and information regarding a human's action and provided from a knowledge base and an inference rule provided from a rule database, wherein each of the items of information respectively belonging to domains different from each other is information that can be represented as a directed graph including a node and an edge, and the integrated information is an integrated graph generated by combining directed graphs that are the items of information respectively belonging to different domains;

setting an inference start node, an inference coverage node and an inference end node among the nodes in the integrated graph and calculating an optimum path among paths in the integrated graph connecting the inference start node and the inference end node; and determining a path that maximizes a sum total of the importance levels of nodes in the path among the paths in the integrated graph connecting the inference start node and the inference end node as the optimum path, wherein the importance level of each node corresponds to an arrival probability of the node, wherein the inference program causes the computer to further execute:

designating a node that the optimum path has been determined to cover as an essential inference coverage node, when there is only one path that covers the essential inference coverage node, determining the one path as the optimum path, when there is a plurality of paths that cover the essential inference coverage node and there is only one path that minimizes the number of nodes in the path among the plurality of paths, determining the one path as the optimum path, and when there is a plurality of paths that cover the essential inference coverage node and there is a plurality of paths that minimize the number of nodes in the path among the plurality of paths, determining a path that maximizes a sum total of the importance levels of the nodes among the plurality of paths minimizing the number of nodes in the path as the optimum path, and a rule node indicating an inference rule and a node generated by applying the rule node are added to the integrated graph as the essential inference coverage nodes.

* * * * *